US011924921B2

(12) United States Patent
Velev et al.

(10) Patent No.: US 11,924,921 B2
(45) Date of Patent: Mar. 5, 2024

(54) METHOD FOR USER PLANE CONNECTION ACTIVATION OR DEACTIVATION PER SESSION

(71) Applicant: NEC CORPORATION, Tokyo (JP)

(72) Inventors: Genadi Velev, Heidelberg (DE);
Toshiyuki Tamura, Tokyo (JP);
Andreas Kunz, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 17/205,848

(22) Filed: Mar. 18, 2021

(65) Prior Publication Data
US 2021/0212160 A1 Jul. 8, 2021

Related U.S. Application Data

(63) Continuation of application No. 16/321,304, filed as application No. PCT/JP2017/029618 on Aug. 18, 2017, now Pat. No. 11,026,292.

(30) Foreign Application Priority Data

Aug. 19, 2016 (EP) .................................... 16185042

(51) Int. Cl.
*H04W 56/00* (2009.01)
*H04L 5/00* (2006.01)
(Continued)

(52) U.S. Cl.
CPC ........... *H04W 80/10* (2013.01); *H04L 5/0098* (2013.01); *H04W 8/08* (2013.01); *H04W 48/18* (2013.01);
(Continued)

(58) Field of Classification Search
CPC ..... H04W 76/12; H04W 76/38; H04W 76/11; H04W 76/27; H04W 8/08; H04W 48/08; H04W 76/00; H04L 5/0098
(Continued)

(56) References Cited

U.S. PATENT DOCUMENTS 6,654,360 B1 * 11/2003 Abrol ...................... H04L 67/04
370/329
8,948,127 B2 2/2015 Keller et al.
(Continued)

FOREIGN PATENT DOCUMENTS

CN 102056112 A 5/2011
CN 102378120 A 3/2012
(Continued)

OTHER PUBLICATIONS

Japanese Office Action for JP Application No. 2019-508979 dated Jun. 22, 2021 with English Translation.
(Continued)

*Primary Examiner* — Sai Ming Chan
(74) *Attorney, Agent, or Firm* — Sughrue Mion, PLLC

(57) ABSTRACT

This disclosure provides a User Equipment (UE), including: a transmitter configured to transmit at least one Protocol Data Unit (PDU) session identifier (ID), each of which indicates a PDU session that the UE needs to use in a Non Access Stratum (NAS) Service Request message to a Mobility Management Function (MMF) via an access network (AN) node when the UE has user data to send.

20 Claims, 15 Drawing Sheets

Example non-roaming reference architecture for access to multiple PDU/PDN sessions

(51) Int. Cl.
| | | |
|---|---|---|
| H04W 8/08 | (2009.01) | |
| H04W 48/18 | (2009.01) | |
| H04W 76/00 | (2018.01) | |
| H04W 76/11 | (2018.01) | |
| H04W 76/12 | (2018.01) | |
| H04W 76/27 | (2018.01) | |
| H04W 76/38 | (2018.01) | |
| H04W 80/10 | (2009.01) | |

(52) U.S. Cl.
CPC ............ *H04W 76/00* (2013.01); *H04W 76/11* (2018.02); *H04W 76/12* (2018.02); *H04W 76/27* (2018.02); *H04W 76/38* (2018.02)

(58) Field of Classification Search
USPC ........................................................ 370/329
See application file for complete search history.

(56) References Cited

U.S. PATENT DOCUMENTS

| | | | |
|---|---|---|---|
| 9,124,608 | B2 | 9/2015 | Jin et al. |
| 2006/0045128 | A1 | 4/2006 | Madour |
| 2009/0040983 | A1 | 2/2009 | Kim et al. |
| 2010/0061386 | A1 | 3/2010 | Olsson et al. |
| 2010/0128646 | A1 | 5/2010 | Gao |
| 2012/0076121 | A1* | 3/2012 | Choi .................. H04W 60/005 370/338 |
| 2013/0058292 | A1 | 3/2013 | Wang et al. |
| 2013/0136114 | A1 | 5/2013 | Hietalahti et al. |
| 2016/0057797 | A1* | 2/2016 | Bangolae .......... H04W 52/0229 370/311 |
| 2016/0095034 | A1 | 3/2016 | Hampel |
| 2017/0079075 | A1 | 3/2017 | Han et al. |
| 2017/0127471 | A1* | 5/2017 | Yu ........................ H04W 76/30 |
| 2017/0339609 | A1 | 11/2017 | Youn et al. |
| 2018/0279397 | A1 | 9/2018 | Faccin et al. |
| 2019/0037636 | A1 | 1/2019 | Kim et al. |
| 2019/0150219 | A1 | 5/2019 | Wang et al. |
| 2019/0223093 | A1 | 7/2019 | Watfa et al. |

FOREIGN PATENT DOCUMENTS

| | | |
|---|---|---|
| CN | 103428636 A | 12/2013 |
| CN | 103442425 A | 12/2013 |
| EP | 2 683 183 A1 | 1/2014 |
| EP | 3 145 259 A1 | 3/2017 |
| JP | 2007180889 A | 7/2007 |
| JP | 4975823 B2 | 7/2012 |
| JP | 2014-096662 A | 5/2014 |
| JP | 2015-526028 A | 9/2015 |
| KR | 10-1532445 B1 | 7/2015 |
| RU | 2446600 C2 | 3/2012 |
| RU | 2 569 104 C2 | 11/2015 |
| RU | 2 576 474 C2 | 3/2016 |
| WO | 2014/067144 A1 | 5/2014 |
| WO | 2015/037882 A1 | 3/2015 |
| WO | 2015160329 A1 | 10/2015 |
| WO | 2015/180157 A1 | 12/2015 |
| WO | 2017/142362 A1 | 8/2017 |

OTHER PUBLICATIONS

Qualcomm Incorporated, "Extensions and corrections to Solution 4.3 to key issue 4 on Multiple PDU sessions to the same Data Network", 3GPP TSG-SA WG2 Meeting #115, S2-163183, May 27, 2016, China, pp. 1-8.
"Update of solution 4.21 & 4.22 relating to paging", Samsung, ETRI, S2-165730, Oct. 2016, pp. 1-9, vol. SA WG2, Kaohsiung City, Taiwan.
"Session management per PDU session", NEC, S2-164953, Aug.-Sep. 2016, pp. 1-5; vol. SA WG2, China.
"3rd Generation Partnership Project; Technical Specification Group Services and System Aspects; Study on Architecture for Next Generation System", 3GPP TR 23.799, V0.6.0 (Jul. 2016), pp. 1-320.
"3rd Generation Partnership Project; Technical Specification Group Services and System Aspects; General Packet Radio Service (GPRS) enhancements for Evolved Universal Terrestrial Radio Access Network (E-UTRAN) access", 3GPP TS 23.401 V14.0.0 (Jun. 2016), pp. 1-374.
Communication dated Aug. 24, 2020, from the Russian Federal Service for Intellectual Property in Application No. 2020111432/07.
Communication issued by the Russian Patent Office dated Oct. 31, 2019 in application No. 2019107584/08.
International Search Report for PCT/JP2017/029618 dated Dec. 5, 2017 (PCT/ISA/210).
3GPP TR 23.799 VQ.7.0 (Aug. 2016), 3rd Generation Partnership Project; Technical Specification Group Services and System Aspects;Study on Architecture for Next Generation System (Release 14), pp. 1-331.
ZTE, "Session Management model with UL-CL in RAN", SA WG2 Meeting #116, S2-164022, Jul. 4-8, 2016, Vienna, Austria, pp. 1-3.
Cisco Systems, Inc. et al., "Consolidated overall CN architecture option", SA WG2 Meeting #116, S2-164195, Jul. 11-15, 2016, Vienna, Austria, pp. 1-4.
China Mobile, "UP model proposal for Session Management", SA WG2 Meeting #116, S2-163347, Jul. 11-15, 2016, Vienna, Austria, pp. 1-12.
Ericsson, "Updates to Solution 6.1 on efficient SSC mode 2 and 3", SA WG2 Meeting #116, S2-164260, Jul. 11-15, 2016, Vienna, Austria, pp. 1-14.
NEC, "Session management per PDU session", SA WG2 Meeting #116bis, S2-164953, Aug. 29-Sep. 3, 2016, China, Sanya, pp. 1-5.
Huawei, HiSilicon, "NAS&S1 entry function for SM and MM separation", S2-164253, Jul. 11-15, 2016, Vienna, Austria.
3GPP TR 23.799 V0.7.0 (Aug. 2016), Technical Report 3rd Generation Partnership Project; Technical Specification Group Services and System Aspects; Study on Architecture for Next Generation System (Release 14) (Aug. 5, 2016).
Japanese Office Action for JP Application No. 2022-178978, dated Feb. 14, 2023 with English Translation.
Russian Office Action for RU Application No. 2020133148 dated Mar. 24, 2021 with English Translation.
Russian Office Action for RU Application No. 2020133148 dated Jul. 20, 2021 with English Translation.
Chinese Office Action for CN Application No. 201780050571.8 dated Mar. 22, 2022 with English Translation.
Nokia et al., Next Generation Network Architecture, 3GPP TSG SA WG2 Meeting #116 S2-163941, Jul. 13, 2016.
Zhang Wei, Realization Techniques of S-GW in LTE/EPS [Research on the Implementation Technology of S-GW in LTE/EPS], China Excellent Doctoral and Master's Thesis Full-text Database (Master) Information Technology Series, Jul. 15, 2015.
Fu Zhi, Design of Access Layer System of WCDMA and GSM Dual Mode Mobile Terminal [The AS Layer System Design for WCDMA and GSM Dual Mode Mobile Terminal], China Excellent Doctoral and Master's Thesis Full-text Database (Master) Information Technology Series, Jun. 15, 2007.
Jyrki T. J. Penttinen et al., 3GPP Mobile Communications: LTE/SAE and LTE-A, Engineering Guidelines for Fixed, Mobile and Satellite Systems, Dec. 31, 2013.
I. Widjaja, P. Bosch and H. La Roche, Comparison of MME Signaling Loads for Long-Term-Evolution Architectures, 2009 IEEE 70th Vehicular Technology Conference Fall, Jan. 12, 2010.
Kim et al., U.S. Appl. No. 62/296,565, filed Feb. 17, 2016.
Kim et al., U.S. Appl. No. 62/297,800, filed Feb. 20, 2016.
Kim et al., U.S. Appl. No. 62/316,590, filed Apr. 1, 2016.
Kim et al., U.S. Appl. No. 62/405,978, filed Oct. 9, 2016.
Nokia et al., Updates to solution 4.8: for Data transmission with ConnectionLess RAN-Core interface, 3GPP SA WG2 Meeting #116, S2-164255, Jul. 17, 2016.
Nokia et al., NR function for Data Connectivity Request, 3GPP TSG-RAN WG3 Meeting #93, R3-161858, Aug. 12, 2016.

(56) References Cited

OTHER PUBLICATIONS

LG Electronics, Support of service continuity using tunnelling between UP Entities, 3GPP SA WG2 Meeting #116, S2-163580, Jul. 5, 2016.

Ericsson, Update of Solution 2.1: QoS functions and distribution, 3GPP SA WG2 Meeting #116, S2-164089, Jul. 17, 2016.

Ericsson, Update of Solution 2.1: QoS functions and distribution, 3GPP SA WG2 Meeting #116, S2-163276, Jul. 5, 2016.

Huawei et al., Correction on Uplink data status IE coding, 3GPP TSG-CT WG1 Meeting #121bis-e, C1ah-200172, Jan. 16-22, 2020.

Hutchison 3G UK Ltd, Multiple RAB Activation Issue, 3GPP TSG CN WG1 Meeting #19, N1-011097, Aug. 27-31, 2001.

Lucent Technologies, PDP Context Activity Indication for Service Request (Service Type =Data), 3GPP TSG CT WG1#44, C1-062414, Oct. 22, 2006.

3GPP TS 24.008 v7.6.0, Mobile radio interface Layer 3 specification; Core network protocols; Stage 3 (Release 7), Dec. 2006.

3GPP TS 23.060 v14.0.0, General Packet Radio Service (GPRS); Service description; Stage 2 (Release 14), Jun. 2016.

SGSN Administration Guide, StarOS Release 21.11, Chapter: Direct Tunnel for 3G Networks, <https://www.cisco.com/c/en/US/td/docs/wireless/asr_5000/21-11_6-5/SGSN-Admin/21-11-SGSN-Admin/21-11-SGSN-Admin_chapter_01110.html>, Nov. 2018.

U.S. Office Action for U.S. Appl. No. 18/094,461, dated Nov. 22, 2023.

* cited by examiner

Example architecture for multiple sessions and sessions with multiple GWs for the same data network Example architecture showing multiple network slices or PDU sessions with corresponding multiple CPFs and UPFs

METHOD FOR USER PLANE CONNECTION ACTIVATION OR DEACTIVATION PER SESSION

CROSS REFERENCE TO RELATED APPLICATIONS

This application is a continuation of U.S. patent application Ser. No. 16/321,304 filed on Jan. 28, 2019, which is a National Stage Entry of International Application No. PCT/JP2017/029618 filed Aug. 18, 2017, which claims priority to European Patent Application No. 16185042.5 filed Aug. 19, 2016, the entire disclosures of which are incorporated herein their entirety by reference.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to the so-called 'Next Generation' systems.

BACKGROUND ART

The disclosure includes a method for independent activation or deactivation of user plane connection per Protocol Data Unit (PDU) session or network slice, where the session contexts in a User Equipment (UE) and in a network (e.g. a Session Management Function (SMF), and a User Plane Function (UPF)) are already established. The solution proposes a (Session Management (SM)) state machine for each established PDU session, where the state machine is maintained either in the SMF or in a Mobility Management Function (MMF) network function. The SM state machines run independently of a Mobility Management (MM) state machine.

General

The following terminologies are used within this document and can be applied to any generation of mobile networks like 2G (Global System of Mobile communications (GSM)), 3G (Universal Mobile Telecommunication System (UMTS)), 4G (Long Term Evolution (LTE)/Evolved Packet Core (EPC)), 5G (New Radio (NR)/NextGen) or any other. For example, if the "UE" or a "serving node" is mentioned in the below description, it can be any generation of the UE or the serving node. The terms 'serving node', 'Mobility Management Entity (MME)/Serving General Packet Radio Service (GPRS) Support Node (SGSN)', 'Mobile Switching Centre (MSC)/SGSN/MME', or Cellular Internet of Things (CIoT) Serving Gateway Node (C-SGN) is generally used through the various embodiments of this document to describe a functional entity like the MSC, the SGSN, the MME, the C-SGN, or other possible control plane functional entities in the mobile network which terminate a control plane signalling (known as a Non Access Stratum (NAS) signalling) between a core network and a terminal. The serving node (MME/SGSN) can be also a functional entity from future generation networks which is responsible for mobility and session management.

The term Home Subscriber Server (HSS)/Home Location Register (HLR) means a repository where the UE's subscription data is stored and can be either the HSS or the HLR or a combined entity. Instead of the HSS also the term Next Generation User Data Management (UDM), Subscriber Database Management (SDM) or Authentication Authorization Accounting (AAA) could be used synonymously.

Functional entities or a network function used in this document as separate entities could be also collocated together or even finer separated in particular deployments or as described in the architecture figures.

The terms 'terminal', 'device', 'user terminal', 'User Equipment (UE)', or 'Mobile Terminal (MT)' are used in an inter-exchangeable manner where all of the terms express similarly an equipment used to send/receive data and signalling from the network, a mobile network, or a radio access network.

The term "session" is used in the same meaning as a "PDU session", a "Packet Data Network (PDN) connection", an "Access Point Name (APN) connection", or a "connection for a particular network slice". The existing sessions are those sessions for which already UE context exists (is established) in the core network control plane and/or user plane and the UE itself. The "existing sessions" has the same meaning as an "established PDU session" or an "established PDN connection". Each session can be identified with a "session ID", which can be similar to an "Evolved Packet System (EPS) bearer ID", the "APN", a "slice ID", a "slice instance ID", a "service ID" or any other temporary or a permanent identifier of the PDN connection, the PDU session or a service used by the UE.

The term "connection" is mostly used for user plane connection where a kind of "path" is established to send uplink (UL) or downlink (DL) data between the UE and a user plane Gateway (GW) terminating the PDU session. Depending on the context, a connection can be either the whole user plane path for the PDU session; or only a connection over a given interface, e.g. connection over a radio interface, or connection over NG3 interface (between the UPF in a next generation core network (NG CN) and a (Radio) Access Network ((R)AN).

The following terminology for the procedures is used:
  Session establishment: e.g. PDU session establishment where SM context exists (is established) in the UE and in the NG CN control plane and/or user plane.
  Session release: deletion of the PDU session, which means the SM context is deleted (released) in the UE and in the NG CN control plane and/or user plane.
  Session/connection activation: activating an UP connection path for session, for which the SM context exist in the UE and in the NG CN.
  Session/connection deactivation: deactivating the UP connection path without deleting the SM context in the UE and in the NG CN. With other words just releasing the UP connection.

The mobility states of the UE are called De-Registered, Registered-Standby ("Standby" for simplicity) and Registered-Ready ("Ready" for simplicity). These states are also called MM states. Please note that there is a difference between the mobility states (the MM states) and session states (SM states).

The telecommunication industry started to work on new generation of network referred as 5th generation (5G) networks. Activities in multiple research and standardization organizations were initiated to develop the 5G network which shall offer services to multiple vertical service providers and serving high variety of terminals. Especially 3GPP in activities were initiated in the RAN area under the term "New Radio" (NR) and in the core network (CN) under the term "NextGen" (NG). Please note that those terms will most probably change before the 5G system is introduced to the market. Therefore terms like NG CN (or NG AN) as used in this document have the meaning of any 5G CN or AN technology.

3GPP studies the NG system architecture and corresponding issues and solutions are captured in 3GPP TR 23.799 [see, NPL 1]. FIG. 1 describes the NG architecture for simultaneous access to multiple PDN connections (called PDU sessions in the NG study), as agreed in [see, NPL 1] by the time of writing. The upper part of FIG. 1 shows an example for NG control plane (NG CP) including a subscriber database management (SDM) 22, a Policy Control function (PCF) 24 and Core Control functions (CCFs) 26. The NG CCF 26 includes among others mobility management function (MMF) and session management function (SMF). The user plane (UP) function(s) are shows as a Core User plane function (NG UPF) 28, as there could be one or multiple UPFs per PDU session configured. Further information about the description of the interfaces and the network functions can be found in TR 23.799 clause 7.3 [see, NPL 1].

One main feature of a 5G system is called network slicing. The 5G use cases demand very diverse and sometimes extreme requirements. The current architecture utilizes a relatively monolithic network and transport framework. Thus, it is anticipated that the current architecture is not flexible and scalable enough to efficiently support a wider range of business needs. To meet such needs, the 5G NG system can be "sliced" in multiple network instances which are referred as network slice instances (NSI). The network slices can be referred as logically separated networks where the resources (processing, storage and networking resources) for different network slices are isolated. A network operator uses a Network Slice Template/Blueprint to create a NSI. The NSI provides the network characteristics which are required by a Service Instance. One example of network architecture allowing a UE to connect to multiple NSIs simultaneously is shown in FIG. 2, as described in [see, NPL 1].

FIG. 2 shows a first network slice type/category (e.g. for IoT services) and a second slice type (e.g. for broadband services). The second network slice type can have multiple NSIs for particular 3rd party customers. This figure shows that the (R)AN is shared and network slicing is applied in the NG CN. However, in future also network slicing the (R)AN is possible where the RAN resources are sliced/isolated, either in baseband processing or in frequency spectrum or both.

[NPL 1] also describes the Common Control Network Functions (CCNF) 32 and Slice-specific Control Plane Network Functions (SCNF), as shown in detail in FIG. 3. The CCNF 32 can include fundamental control plane network functions to support basic functions operation common among the NSIs, for example:
 1. Subscriber Authenticator,
 2. Mobility Management,
 3. Network Slice Instance Selector (NSI Selector),
 4. NAS Routing Function, etc.
In general, the NG system design should enable the transmission of any kind of data. It is assumed that the NG system supports the following PDU session types:
 IP type (e.g. IPv4 or IPv6 or both), or
 non-IP session (any unstructured data) or
 Ethernet type.

One further solution described in 23.799 in clause 6.4.3 is shown in FIG. 4. The UE 34 may establish multiple PDU Sessions to the same data network in order to satisfy different connectivity requirements of different applications (e.g. session continuity) that require connectivity to the same data network. In this solution, the MM and SM functions are separated. With this, one main concept is that multiple SM contexts can be available per MM context. Also, different session continuity types per PDU session are possible.

CITATION LIST

Non Patent Literature

[NPL 1]
3GPP TR 23.799 v0.6.0, 2016-07, "Study on Architecture for Next Generation System"
[NPL 2]
3GPP TS 23.401, v14.0.0, 2016-06, "General Packet Radio Service (GPRS) enhancements for Evolved Universal Terrestrial Radio Access Network (E-UTRAN) access"

SUMMARY OF INVENTION

Technical Problem

The scenario considered in this document is that a UE is attached to the network and can be associated with multiple UP-GWs (UPFs). The different UPFs can be part of the (a) same PDU session, (b) part of different PDU sessions, or (3) part of different network slice instances (NSIs). With other words, multiple NG3 connections (e.g. tunnels over NG3 interface) between the (R)AN and the UP-GWs can be available. If the UE has established multiple PDU sessions, then multiple Session Management Function (SMF) instances may exist per UE.

One assumption in this document is that a UE's "session" (or also called "PDN connection" or "PDU session" to a particular data network) can be in Idle (inactive) state or Active (connected) state. In this sense the terms "Idle session" or "Active session" are used. If a session is in "IDLE" state, then there is no NG3 connection/tunnel established between the UPF and (R)AN. If a session is in "ACTIVE" state, then there is NG3 connection/tunnel established between the UPF and (R)AN. It is further assumed that for an established UE's session a Session Management Function (SMF) is instantiated/configured in the control plane and corresponding one or more UPFs are instantiated/configured in the user plane. Further details about the IDLE and ACTIVE session state of the Control Plane Function (CPF) and the UPF can be found below.

Assuming that between the AN and the multiple UPFs there will be NG3 tunnels setup for transmitting data packets, the problem occurs of establishment, modification and release of multiple NG3 tunnels each time when the UE transfers from Standby to Ready mobility state.

Compared with EPC where a single Serving GW is configured per UE, and thus a single S1-U tunnel is established and released during Standby→Ready transition, in NG having multiple UPFs, multiple tunnels over NG3 interface are established/released. Therefore the problem is that the signalling for tunnel establishment is increased when a single UPF (or PDU session) is in use, but multiple NG3 tunnels are established/released.

Further, if all existing sessions are in IDLE state and downlink data arrives for a particular session, there should be a way to synchronize SM state between the UE and the NG system. Thus, for a MT call, it is currently not possible for the UE to activate only a single Application which is associated to a session that triggers the MT call.

In addition, it is possible that a mobility management mechanism maintains MM state always in Ready state in the NG core network (CN) as long as the UE is attached/registered to the NG system. With this, the NG CN has only Registered and Deregistered mobility states of the UE. This MM mechanism is advantageous for paging of mainly stationary devices or low-mobility devices for which the paging area is relatively narrow. With this architecture, the NG CN knows the location of the UE and the NG3 tunnels are always active. This means that the Session state is always "Active". This document also targets to solve a potential problem in case such devices have another application which is configured to access with a different session at the same time. In the case, the NG CN performs session management while the (R)AN performs mobility management. As a result, all NG3 connections/tunnels for all sessions are always established, i.e. all sessions are always in Active session state. When the UE moves and changes (R)AN node, all tunnels needs to be updated, meaning that the CCNF and the SMFs needs to update all UPFs with the new tunnel endpoint information. This would result in increased signalling.

This disclosure seeks to solve or at least alleviate the above problems by reducing the required signalling for NG3 tunnel establishment allowing the activation of a particular session out of multiple existing sessions.

Solution to Problem

An example aspect of the present disclosure is a User Equipment (UE), including: a transmitter configured to transmit at least one Protocol Data Unit (PDU) session identifier (ID), each of which indicates a PDU session that the UE needs to use in a Non Access Stratum (NAS) Service Request message to a Mobility Management Function (MMF) via an access network (AN) node when the UE has user data to send.

DESCRIPTION OF EMBODIMENTS

In order to solve the above described problem, different solutions are described in various example embodiments herewith.

Figure 6:
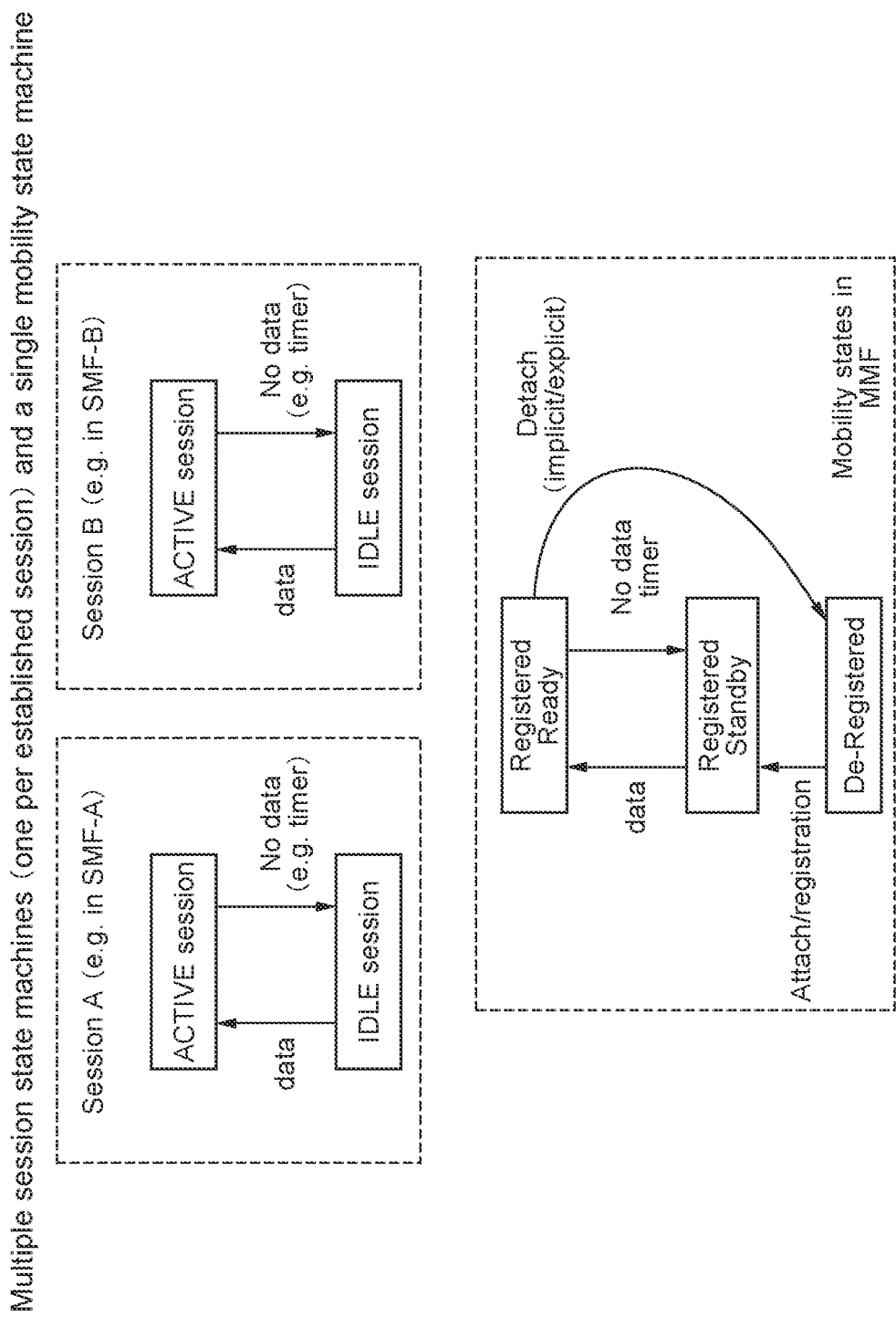
FIG. 6 shows multiple session state machines (one per established session) and a single mobility state machine.

Please note that the terms "Idle" session or "Active" session are used for the SM states, whereas Standby and Ready states are used for the UE's mobility states. Also the transition from Idle session state to Active session state can be called "session activation" whereas the transition from Active session state to Idle session state can be called "session deactivation". This is shown in FIG. 6.

The terms "session activation" procedure or "session deactivation" procedure relates to the establishment or release of NG3 connections/tunnels. These terms are different from "session establishment" or "session release" procedures which relates to the establishment of a new session including establishment of SM context in both UE and NG CN or correspondingly deletion of existing session, i.e. deletion of the SM context in the UE and the NG CN.

Figure 1:
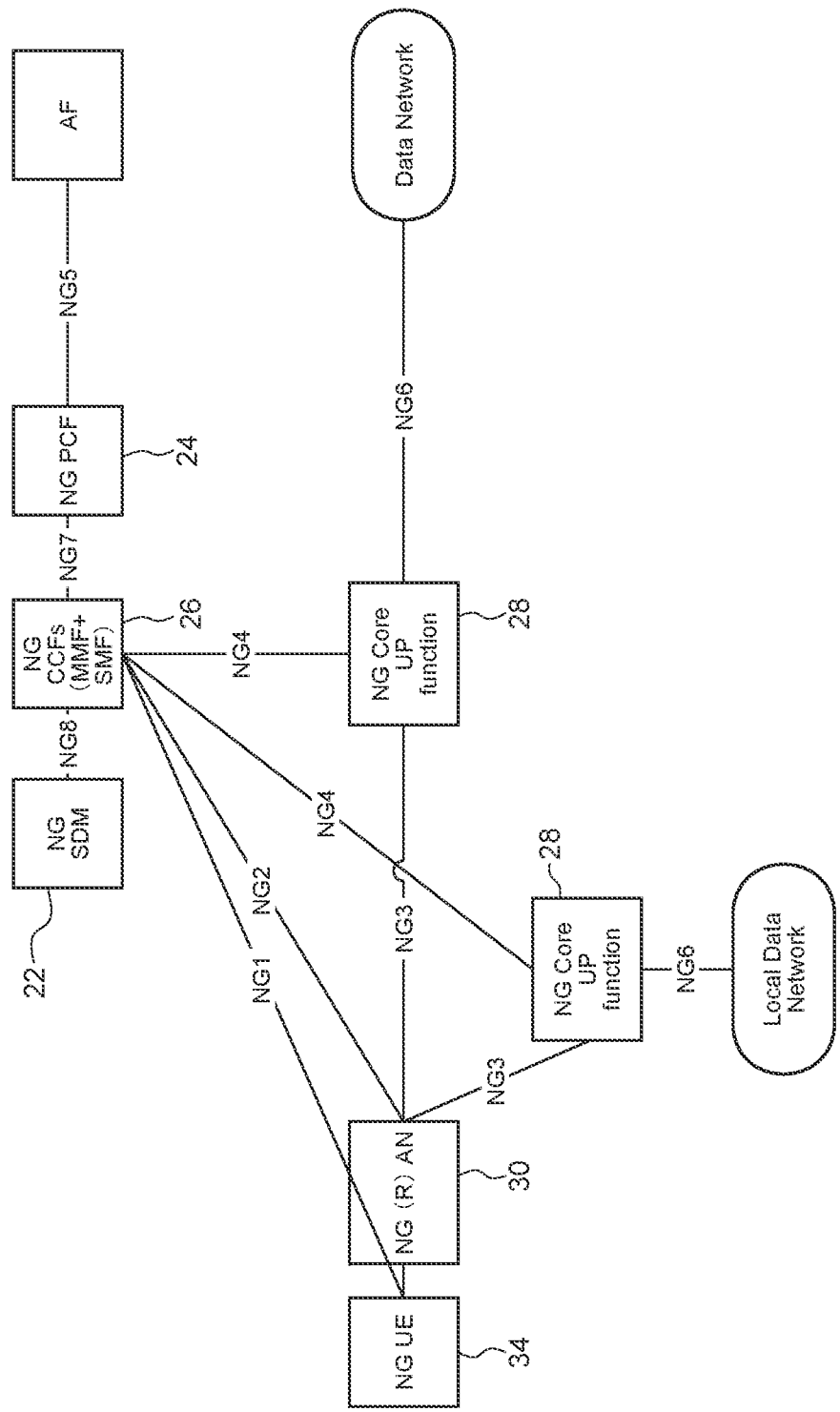
FIG. 1 describes the NG architecture for access to multiple PDN connections (called PDU sessions in the NG study)
Figure 5:
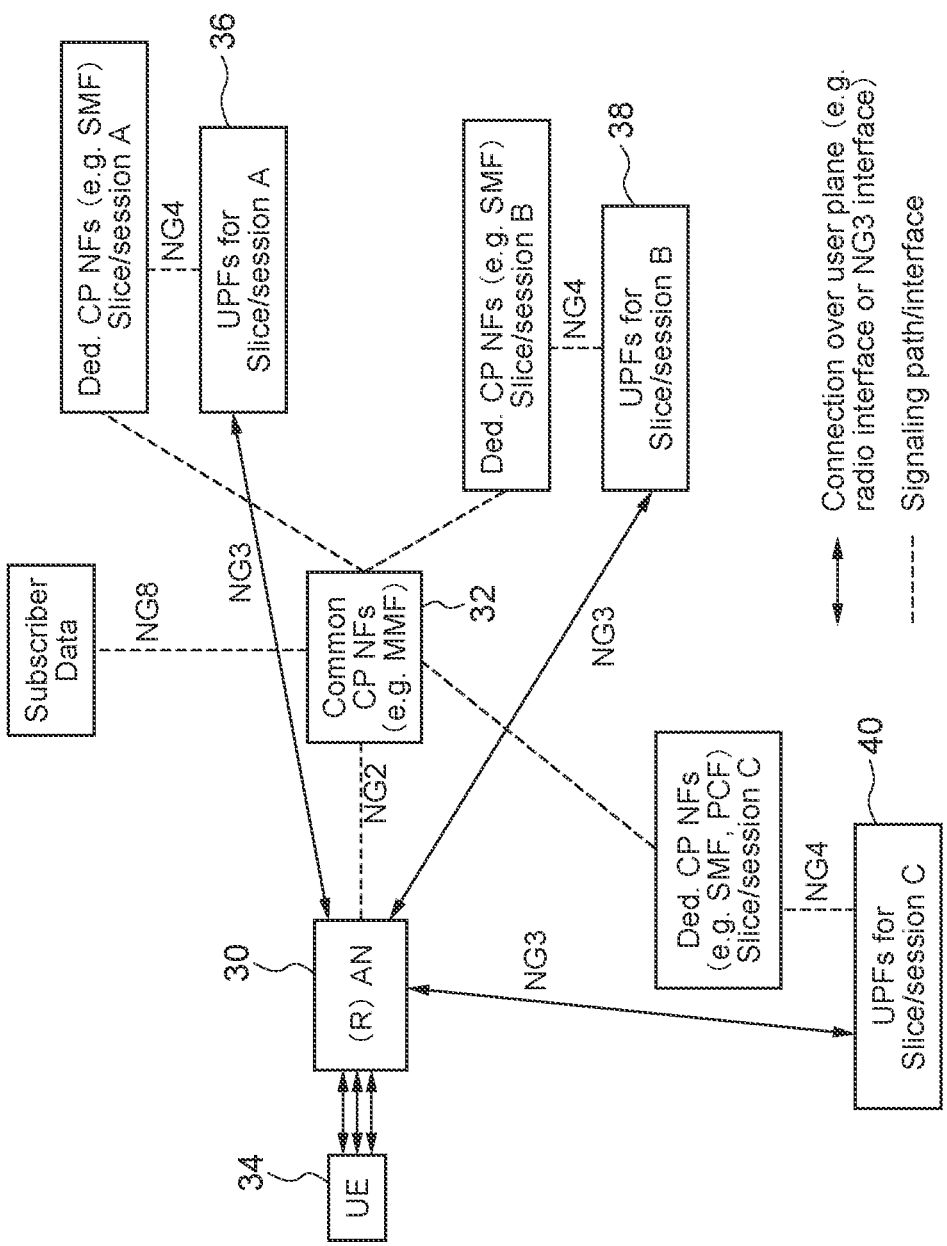
FIG. 5 shows an example architecture showing multiple network slices or PDU sessions with corresponding multiple CPFs and UPFs.

For the purposes of this document the reference architecture from FIG. 1 for a single established session (network slice or PDU session) is assumed. For multiple established sessions FIG. 5 is assumed as reference architecture where a UE has established 3 different sessions A, B and C. The different sessions can belong to different network slices or to the same network slice but having multiple PDU sessions. In the control plane there is a box denoting CCNF 32 which are shared among network slices or PDU sessions. These CCNFs can include mobility management Network Function (NF) (called MMF), Authentication/Authorization/Security NF, NAS signaling routing NF and others. As it is shown in FIG. 5, each PDU session or network slice can have independent dedicated CPFs. The Dedicated CPFs can include the following exemplary network functionality:

SMF: it is assumed in this document that this function is responsible for the session management for a specific session (network slice, or PDU sessions).

CPF of a GW (aka GW-C of the UPF), as the Control Plane (CP) of the GW is known as S/PGW-CP function from the control/user plane separation in EPC, called Control and User Plane Separation (CUPS).

PCF: the complete or part of the PCF as described in FIG. 1. This means that some parts of the PCF can be a part of the CCNF 32 and other parts can be part of the Dedicated CPF.

Authentication, Authorization and Security functions related to the specific Network slice of PDU session.

Please note that the UE 34 is shown in FIG. 5 by having 3 arrows towards the (R)AN node 30 which represents 3 radio connections corresponding to the 3 sessions/slices A, B and C. However, this is just an example. The UE 34 can have e.g. 3 user plane radio connections (each per session) and just a single control plane radio connection. Alternatively the UE 34 can have 3 user plane radio connections and 3 control plane radio connection (each per session).

For simplicity, within this document the term SMF is used to denote all Dedicated CPFs as listed above for a PDU session or network slice. Each SMF has a signaling association with the CCNF 32 per the UE 34. For each established session, the CCNF (e.g. MMF) 32 and the SMF know each other and can send signaling at any time independent of the UE's mobility or session state. Further, the CCNF 32 and the SMF have exchanged a UE ID or a subscriber ID (temporary or permanent) and use this ID in each signaling message exchange in order to point to the corresponding UE's context in the CCNF 32 or in the SMF.

In addition, a UPF (3GPP specified GW functionality e.g. to enforce Quality of Service (QoS) or traffic policies) per network slice or PDU session is configured/instantiated. Each of the (NG3) connections A, B or C can be managed independent, i.e. can be established, modified or released independent from the other connections. Please note that there can be one or multiple UPFs. For example a UPF closer to the Edge can be used as mobility anchor and a UPF deeper in the CN can be used as IP anchor (hosting the UE's IP address). For simplicity, in this document a single UPF is used. However, the SMF is able to configure multiple UPFs if multiple UPFs are needed and instantiated/configured for a given session.

As exemplary shown in FIG. 5, it is assumed that there are 3 connections (e.g. tunnels over NG3) between (R)AN and UPFs: a single connection for slice/session A 36, slice/session B 38 and slice/session C 40. If tunneling over NG3 is used per UE 34 between (R)AN and UPFs A/B/C 36/38/40, then there will be 3 tunnels activated/modified/released each time when the UE 34 transfers among Standby<→Ready mobility state. Even worse, if the tunneling over NG3 is per IP flow or per bearer then even more tunnels need to be activated/modified/released for each Standby and Ready mobility state transition.

FIG. 5 shows for session C that the dedicated CPFs can include the SMF and the PCF. It is noted that the existence of PCF in the dedicated CPF may be based on the particular use case, e.g. for some network slices the PCF can be instantiated/configured per slice, whereas for other network slices the PCF can be instantiated/configured as common CPNF.

In this document it is proposed that in case of multiple existing/established PDU sessions (or connectivity to multiple network-slices simultaneously) the system architecture allows to activate/deactivate a single session, which means 1) activating the session state in the corresponding CPF, e.g. SMF; and 2) to activate a single UP session by establishing a corresponding connection/tunnel between the (R)AN node 30 and the UPF. Other UP sessions (for other PDU sessions or other network slices) are not activated (i.e. in Idle state) if there is no data sent in uplink or downlink (UL or DL).

As depicted in FIG. 6, there are independent session state machines per existing session (i.e. per network slice, or PDU session). This is shown as Session A state machine and Session B state machine. This session state machines are applicable both in the UE 34 and in the NG CN. During the establishment of a UE session, a SMF entity is selected and configured by the CCNF (MMF). The SMF entity starts maintaining UE's context related to this session. For example, the UE's session context in the SMF can contain among others the following parameters:

UE temporary or permanent ID, corresponding session ID;
session type (e.g. IPv4/Ipv6, non-IP, Ethernet);
session continuity and/or service continuity mode(s) (e.g. Session and Service Continuity (SSC) mode 1/2/3);
QoS parameters (e.g. non-Guaranteed Bit Rate (non-GBR), GBR parameters, maximum session bit rate);
policy parameters;
needed session subscription parameters;
session state machine, etc.

With other words, independent of the state (Active or Idle) of the session state machine in the SMF, the SMF maintains UE's session context like the parameters listed above.

In addition, in case that the UE 34 is a permanent Ready mobility state from NG CN perspective, this may result in permanently activated connections/tunnels over NG3 interface and correspondingly resulting in sessions which are in permanent Active session state in the NG CN. Then the session (SM) state machines can be managed either in the (R)AN or in the NG CN.

The transition from Idle to Active session state happens for example 1) if data for transmission in the UL or the DL is available or 2) if a scheduled session activation is configured in the SMF. In Active session state the SMF knows the current location of the UE in terms of (R)AN node UP details for data forwarding. Correspondingly the UPF has established connection with the (R)AN node 30 over NG3 interface and policy and QoS parameters has been enforced in the UPF for the given session. If there is no data in the UL or the DL or there is no need to keep the user plane connection for a particular session, the (R)AN node 30 or the UPF can trigger transition to Idle session state. Please note that the UP connection deactivation is different from session release, as in connection deactivation the UE's context is still kept in the NG CN (e.g. SMF). In Idle session state the UPF does not have an established connection over NG3 interface and the SMF does not know (R)AN node UP details and exact MM mobility state (i.e. Registered Standby or Ready).

When the SMF for a given session (e.g. SMF-A) is in Idle state, in CP the SMF doesn't know the (R)AN node UP details, e.g. IP address, tunnel identifier, transport port ID, or other parameters. The SMF does have UE's context about this session, for example including QoS parameter, policy parameters (e.g. Charging policies or Application Detection policies), or needed session subscription parameters, etc. In the UP, the UPF does not have connection (e.g. no tunnel established) towards the (R)AN node 30.

On the other hand, if an SM instance in Active state, in CP the SMF (e.g. SMF-A) knows the (R)AN node details like IP address, tunnel identifier, transport port ID, or other parameters. In the UP, the UPF has a connection/tunnel established to the (R)AN node 30.

This document focuses on the procedures for activation and deactivation of sessions (i.e. activation/deactivation of UP connections), which is different from the procedures for establishment of a new session or release of an existing session. For example the establishment of a new session means the establishment of UE's SM session context in the SMF, the session context in the UE 34 itself and the corresponding NAS SM message exchange between the UE 34 and the SMF. It is assumed that for each established session, the SMF and the MMF 32 maintain a signalling association for exchanging session-related signalling.

In another example, the release of an existing session means the deletion of the SM context in the SMF, in the UPF and in the UE. For example if the UE 34 is detached from the network, i.e. the MM state is Deregistered, then the MMF 32 triggers a session release procedure, which is also not in the scope of this this document.

This document proposes that the CCNF (e.g. MMF) 32 maintains UE's context having knowledge about the session (SM) state in the SMF(s). With other words, the MMF 32 knows the session state (Idle or Active) of all configured SMF(s) for the established sessions. In addition to the mobility (MM) context, the MMF 32 maintains also information for all established sessions. For example the MMF 32 needs to know if a session A is activated, i.e. the SMF-A is in Active state, so that the MMF 32 is able to update the SMF with the new (R)AN node details (e.g. IP address, tunnel identifier, transport port ID, or other parameters) each time when (R)AN node changes. On the other hand, if a session A is deactivated, i.e. the SMF-A is in Idle state, then the MMF 32 does not need to update the SMF when (R)AN node changes. In one alternative, the session states as shown in FIG. 6 can be also maintained in the MMF 32 only, or in both the MMF 32 and the SMF.

For this purpose, the signalling exchange between the SMF and the MMF 32 may be based on various alternatives:

Direct/explicit signalling between the SMF and the MMF 32 (in both directions) is used to exchange information about the current session state. The SMF can inform the MMF 32 about the session's state each time when the session state changes. If the MMF 32 knows that a particular session is in Active state, the MMF 32 informs the SMF corresponding to this session about (R)AN node changes, other Radio Access Technology (RAT) events (e.g. RAT changes) and other possible mobility events. Further, during Active session state the SMF may inform the MMF 32 about UPF changes, e.g. due to load balancing or other events the UPF for this session can change.

Alternatively, there may be no explicit signalling between the SMF and the MMF 32 needed to inform the session state change, as the MMF 32 may derive the session state based on the NAS signalling between the UE 34 and the SMF.

In general, the SMF does not need to maintain current MM state information. For example, if a particular session is in Idle state, the SMF does not need to know whether the UE 34 changes from Ready to Standby mobility state due to transmission of UL or DL data for other sessions. In contrast, if a session is in Active state, the corresponding SMF needs to know about (R)AN node details (UP details like IP address and/or tunnel endpoint IDs), other RAT events (RAT changes) and change from Ready to Standby MM state. The latter event of change from Ready to Standby MM state would result in the SMF to trigger the UPF to deactivate the NG3 connection/tunnel.

Assuming that the session states (Idle, Active) are maintained in the UE 34 and the SMF, then direct signalling exchange between the UE 34 and the SMF is advantageous. Such signalling exchange is based on NAS SM signalling enhanced with additional parameters like session ID or indication for UP connection activation or deactivation.

Several procedures are described below to cover the activation and deactivation of a session considering the various trigger sources.

Solution 1: Session Activation when No Another Active Session Exists (e.g. UE is in Standby MM State)

The solution described herewith is related to the scenario where multiple sessions have been established (e.g. towards different network slices or different PDU sessions) and the UE 34 is in Standby mobility state. This means that all session are in Idle session state. If a downlink data arrives for a given session, then the solution proposed herewith allows activating only this particular session or in addition another session(s) whereas other existing sessions continue to be Idle state.

Solution 1.1: Indication of Session ID to UE During the Paging Procedure

Figure 7:
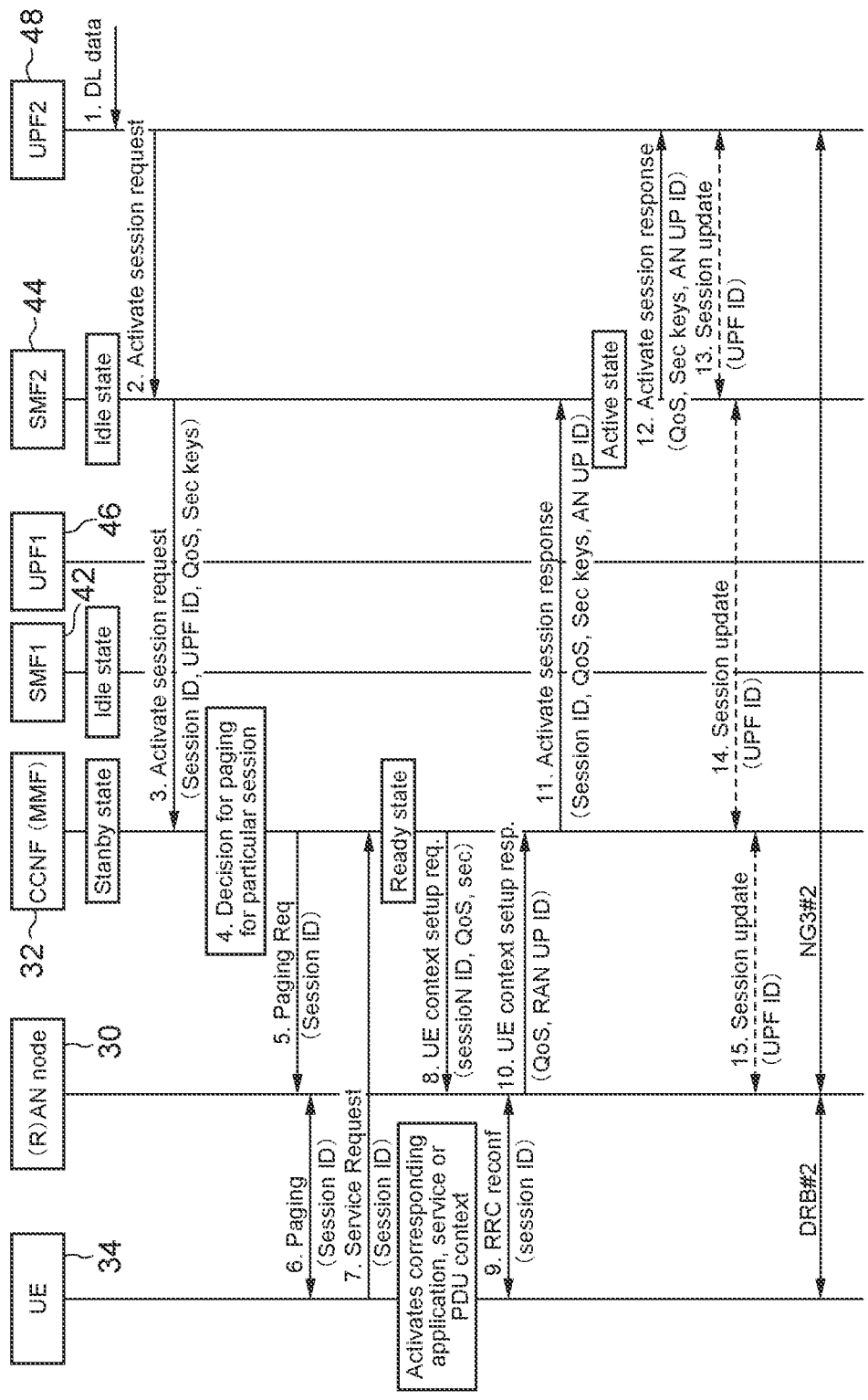
FIG. 7 shows the existence of 2 sessions already established for a given UE.

In particular, FIG. 7 shows the existence of 2 sessions already established for a given UE 34. This means that the UE 34 has IP configuration for each session and can send and receive data over each session. As the UE 34 is in Standby mobility state (shown as the CCNF 32 in Standby state), the corresponding session #1 state (represented by the SMF1 42 in the CP) and session #2 state (represented by the SMF2 44 in the CP) are in Idle too. In the UP, the UPF1 46 and the UPF2 48 have a UE-related context (e.g. to enforce policies for the configured UE's IP addresses and association with the corresponding CPF like the SMF), but there is no connection/tunnel to any (R)AN node 30 to transmit packets.

The steps from FIG. 7 are described in detail as follows:

Step (1) Downlink data arrives at the UPF2 48. As the session #2 is in Idle state, the UPF2 48 does not have an established connection/tunnel towards any (R)AN node 30. It is assumed that there is a NG4 session established for the given the UE 34 between the CPF and the UPF. Thus, the UPF2 48 requests the CPF corresponding to this session (e.g. the SMF2 44) to initiate session activation.

Step (2) The UPF2 48 initiates a procedure for activating the user plane connection (e.g. NG3 tunnel) towards the (R)AN. The UPF2 48 sends an Activate session request to the SMF2 44. This message can be also called a Create session request, a NG3/UP session request, or any other similar to corresponding Sx interface related message specified in TS 23.214. The Activate session request can include one or several of the following informational elements: a UE temporary or a permanent identifier, a session identifier, a DL packet buffering indication, and other parameters.

Step (3) The SMF2 44 receives the request from the UPF2 48 and validates the message and determines the corresponding UE's context and session(s) which needs to be activated. The SMF2 44 sends an Activate session request towards the CCNF (e.g. MMF) 32. Similar to step (2), this message can be called differently e.g. the Create session request (or the NG3/UP session request) as long as the message serves the purpose of activating/establishing a UP connection between the (R)AN node 30 and the UPF. This message can also be called a Session activation request or any other expressing the activation of an existing PDN (PDU/bearer) context. The request from the SMF2 44 can contain UE ID(s), a session ID, a UPF ID (needed for NG3 tunnel establishment, e.g. an IP address, a tunneling endpoint ID and/or a transport layer port ID), required QoS indication, optionally security keys and other parameters. Depending on the power saving mode, if the Activate session request may contain a user packet to be buffered. The SMF2 44 determines whether another UPF served by the same SMF2 44 has already an active session. If this is not the case, the SMF2 44 requests the associated CCNF (e.g. MMF) 32 to perform the session activation procedure toward the (R)AN, if needed.

The security keys can be used in case that there is different security required for the particular UP session and the keys are stored in the SMF.

Step (4) The CCNF (e.g. MMF) 32 determines whether the UE 34 is in Standby or Ready mobility state. In this example, because the UE 34 is Standby state, e.g. not know (R)AN location, the CCNF 32 initiates a paging procedure.

Step (5) The CCNF 32 sends a paging request towards the possible (R)AN nodes 30 where the UE 34 camps. In this paging message, the CCNF 32 includes single or multiple session ID(s). The session ID(s) can be any of an APN, a slice ID, a slice instance ID or a service ID. The CCNF 32 includes multiple session ID(s) based on subscriber data in the CCNF 32 that has been obtained from the HSS. Additional session ID(s) may be related to the original session ID that corresponds to the SMF2 44 in this flow or totally independent from the original session ID.

Step (6) The (R)AN node 30 performs the paging procedure over the radio interface including the received session ID(s) in step (5).

Step (7) After the UE 34 receives a paging message, the UE 34 performs radio connection establishment with the (R)AN node 30 and sends a NAS Service Request message to the CCNF 32 over NG1. Both the radio connection establishment message and the NAS Service Request message may include single or multiple session ID(s). The UE radio layer(s) indicates via internal Application Programing Interfaces (APIs) to the service, application or existing PDN/APN/PDU/bearer context that corresponds to this explicit session to be activated. Such internal cross-layer exchange in the UE 34 can be performed either at step (7) or after step (9).

The UE 34 can include the session ID(s) in the NAS Service request message in order to indicate to the MMF (as part of the CCNF 32) that the session ID(s) has been successfully processed in the UE 34. Please note that the CCNF 32 may have a front-end functionality for NAS signalling, so that the NAS Service Request message after reaching the front-end can be internally forwarded to the correct MMF for further processing. If the session ID(s) is/are missing in the Service request message, this may be an implicit indication that the UE 34 couldn't process the session ID(s) from the paging message.

Step (8) The CCNF (e.g. MMF) 32 determines (correlates) that the NAS Service Request message is as result to the Paging procedure. The CCNF 32 determines that only a session requested by the SMF2 44 needs to be activated. The CCNF 32 generates the corresponding UE context setup request message and sends it to the (R)AN node 30. The UE context setup request message contains, in addition to other UE parameters like required QoS indication and security parameters, also a session ID parameter. When multiple sessions need to be activated, this step (8) can be either executed session by session or one procedure activates all requested sessions at once.

Step (9) The (R)AN node 30 performs radio connection reconfiguration shown as Radio Resource Control (RRC) connection reconfiguration in the figure. During this procedure, the (R)AN node 30 indicates the session ID parameter to the UE 34.

Based on the received session ID, the UE 34 can activate the corresponding service, application or existing PDN/APN/PDU/bearer context. The UE 34 does not activate all existing PDN/APN/PDU/bearer contexts. The UE 34 updates SM state in the UE 34 that corresponds to the session ID(s) received by step (6).

Step (10) The (R)AN node 30 responds to the request in step (8) about the establishment of the radio connection. The (R)AN node 30 for example sends a UE context setup response message. The response can be positive or negative. The UE context setup response message includes the UP identifier of the (R)AN node 30 (IP address and tunneling endpoint ID and/or transport layer port ID) shown as (R)AN UPF ID in the figure. In case the CCNF 32 decided to add additional session ID(s) in step (5), then the CCNF 32 initiates to activate session(s) towards associated UPF to each additional sessions. The CCNF 32 informs all associated UPF(s) via associated SMF(s) of the UP identifier of the (R)AN node 30 (an IP address, a tunneling endpoint ID and/or a transport layer port ID) shown as (R)AN UPF ID in the figure.

Step (11) The CCNF 32 responds to the SMF2 44 corresponding to the request in step (3). For example the CCNF 32 sends an Activate session response message which can contain an indication about the successful or unsuccessful activation of the session corresponding to the session ID. This message includes in addition to other UE parameters like required a QoS indication (or modified QoS parameters) and security parameters, also a session ID parameter.

The SMF2 44 derives the policy and QoS parameters to be enforced in the UPF2 48.

The SMF2 44 transfers from Idle session state to Active session state.

Step (12) The SMF2 44 responds to the step (2) procedure. The SMF2 44 establishes or modifies the needed UE context in the UPF2 48 by sending an Activate session response message. This message can include parameters for policy enforcement (like a traffic QoS indication, a traffic gating behaviour, a session maximum bitrate), the (R)AN UPF ID (including the (R)AN node IP address, the tunneling endpoint ID and/or the transport layer port ID), charging related configuration (e.g. for Charging Data Record (CDR) generation and/or online/offline charging session establishment), optionally security parameters, among others.

Please note that the security parameters are needed in case of security termination at the CN UPF node like the UPF2 48. In case where the security is terminated at the (R)AN node 30, security parameters are not needed at this step.

Step (13) to step (15): If the UPF information for NG3 connection/tunnel establishment hasn't been exchanged during step (3), then the UPF2 48 may optionally perform the Update session procedure towards the SMF2 44 in order to update the UP connection information called a UPF ID (e.g. an IP address, a tunneling endpoint ID and/or a transport layer port ID). Alternatively the SMF2 44 may have such a NG3-related UP information itself, so that SMF2 44 can initiate the Update session procedure (by sending a session update request message including the UPF ID) towards the CCNF (e.g. MMF) 32. Finally the CCNF (e.g. MMF) 32 updates the (R)AN node 30 with the UPF ID.

Solution 1.2: Indication of Session ID to UE During the Service Request or Corresponding RRC Establishment Procedure FIG. 8 shows an alternative solution where the paging procedure is enhanced to include the session ID parameter in the paging request message.

Figure 8:
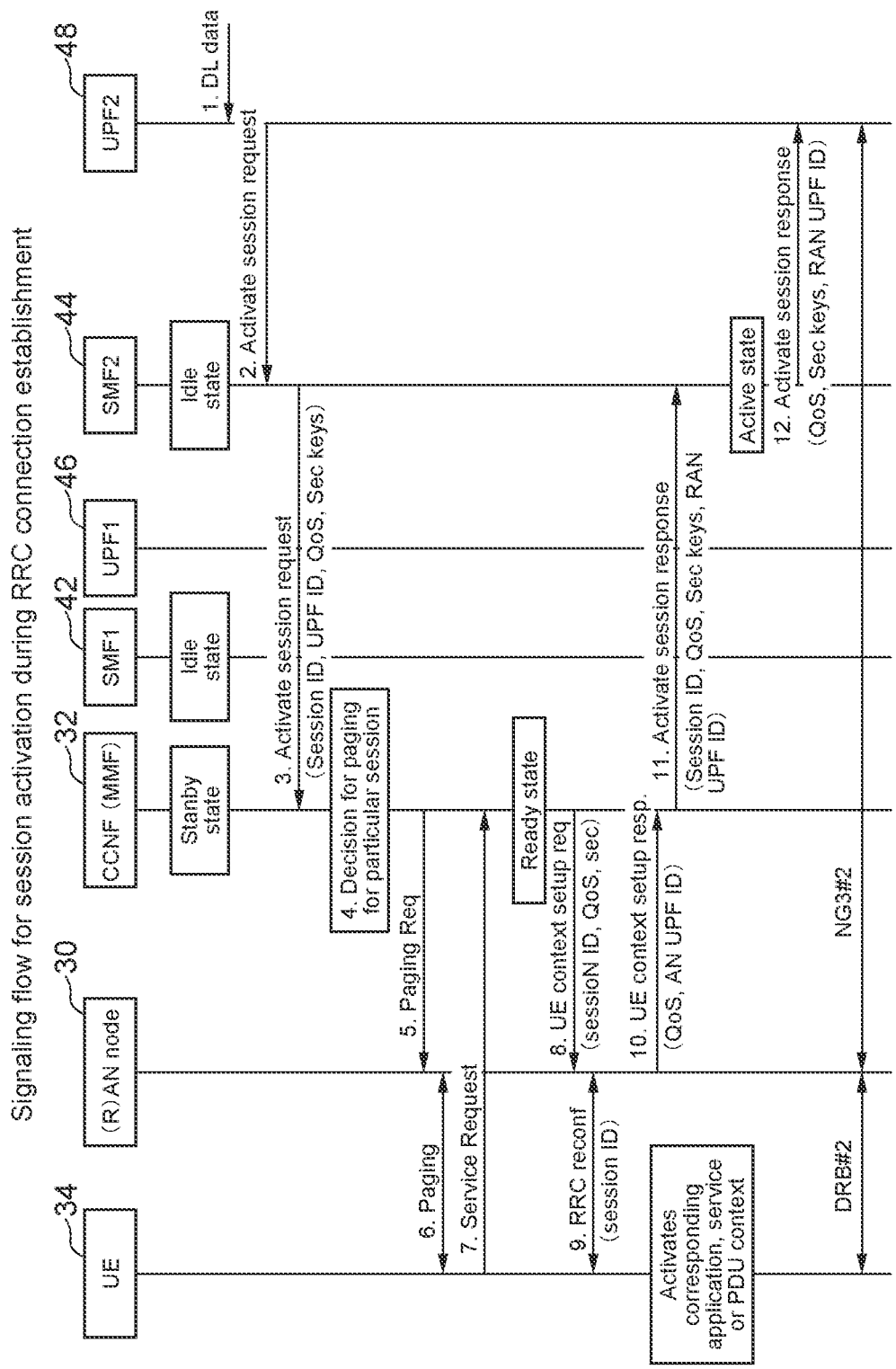
FIG. 8 shows that a paging procedure where the session ID for activation of a single PDU/PDN session is indicated to the UE during the Radio Resource Control (RRC) connection establishment request.

FIG. 8 shows that a paging procedure where the Paging message does not include a session ID, but instead the session ID for activation of a single PDU/PDN session is indicated to the UE 34 during the RRC connection establishment procedure. Only steps (5)-(9) are described in details below, as the rest of the steps are similar to FIG. 7.

Step (5) The CCNF 32 sends a paging request towards the possible (R)AN nodes 30 where the UE 34 camps. The paging request message does not include a session ID parameter to indicate to the UE 34 which session should be activated.

Step (6) The (R)AN node 30 performs paging over the radio interface. This message does not include the session ID as per step (5).

Step (7) After the UE 34 receives a paging message, the UE 34 performs radio connection establishment with the (R)AN node 30 and sends a NAS Service Request message to the CCNF 32 over NG1.

Step (8) The CCNF 32 determines (correlates) that the NAS Service Request message is as result to the Paging procedure. The CCNF 32 determines that only a session requested by the SMF2 44 in step (3) needs to be activated. The CCNF (e.g. MMF) 32 changes the UE mobility state from Standby state to Ready state.

The CCNF 32 generates the corresponding UE context setup request message and sends it to the (R)AN node 30. The UE context setup request message contains, in addition to other UE parameters like QoS and security parameters, also a session ID parameter. When multiple sessions need to be activated, this step (8) can be either executed session by session or one procedure activates all requested sessions at once (e.g. by including a list of all session IDs and corresponding parameters).

Step (9) The (R)AN node 30 performs radio connection reconfiguration shown as RRC connection reconfiguration in the figure. During this procedure, the (R)AN node 30 indicates to the UE the session ID parameter for the session to be activated.

Based on the received session ID, the UE 34 can activate the corresponding service, application or existing PDN/APN/PDU/bearer context. The UE 34 does not activate all existing PDN/APN/PDU/bearer contexts, but only the indicated ones. The UE 34 updates its session/SM state(s) that corresponds to the session ID(s) received by step (9).

Please note that steps (13) to (15) in FIG. 7 can be performed in solution 1.2 as well (although not shown in FIG. 8).

The choice between the solution alternatives shown in FIG. 7 or in FIG. 8 can be done in the CCNF (e.g. MMF) 32 based on the capabilities of the (R)AN nodes 30 or based on the capabilities of the UE 34. The UE capabilities regarding supported paging feature(s) can be exchanged during the Attach procedure or other mobility procedure via NAS MM signaling. The (R)AN node capabilities can be exchanged during the interface setup between the (R)AN node 30 and the CCNF 32 (e.g. NG2 interface or S1-MME setup exchange).

Solution 2: Activation of Session when Other Active Session(s) Exist (e.g. UE is in MM Ready State)

While the scenario solved in solution 1 has the assumption that there are no other session in Active state (e.g. the UE 34 is in Standby mobility state), the assumption for solution 2 is that the UE 34 is in Ready mobility state during DL data is arriving for a session which is in Idle state. In particular, considering FIG. 9, it is assumed that the UE 34 has an Active session context for Session #1 terminated at the UPF1 46.

The unique problem is that the UE 34 already has existing PDU session (e.g. SM) contexts in Idle session state and the radio connection to be established shall be linked to this single PDU context out of multiple existing PDU session contexts. It is proposed that such a linkage between a new data radio connection/bearer and existing session context in the UE 34 is performed by using the session ID.

Figure 9:
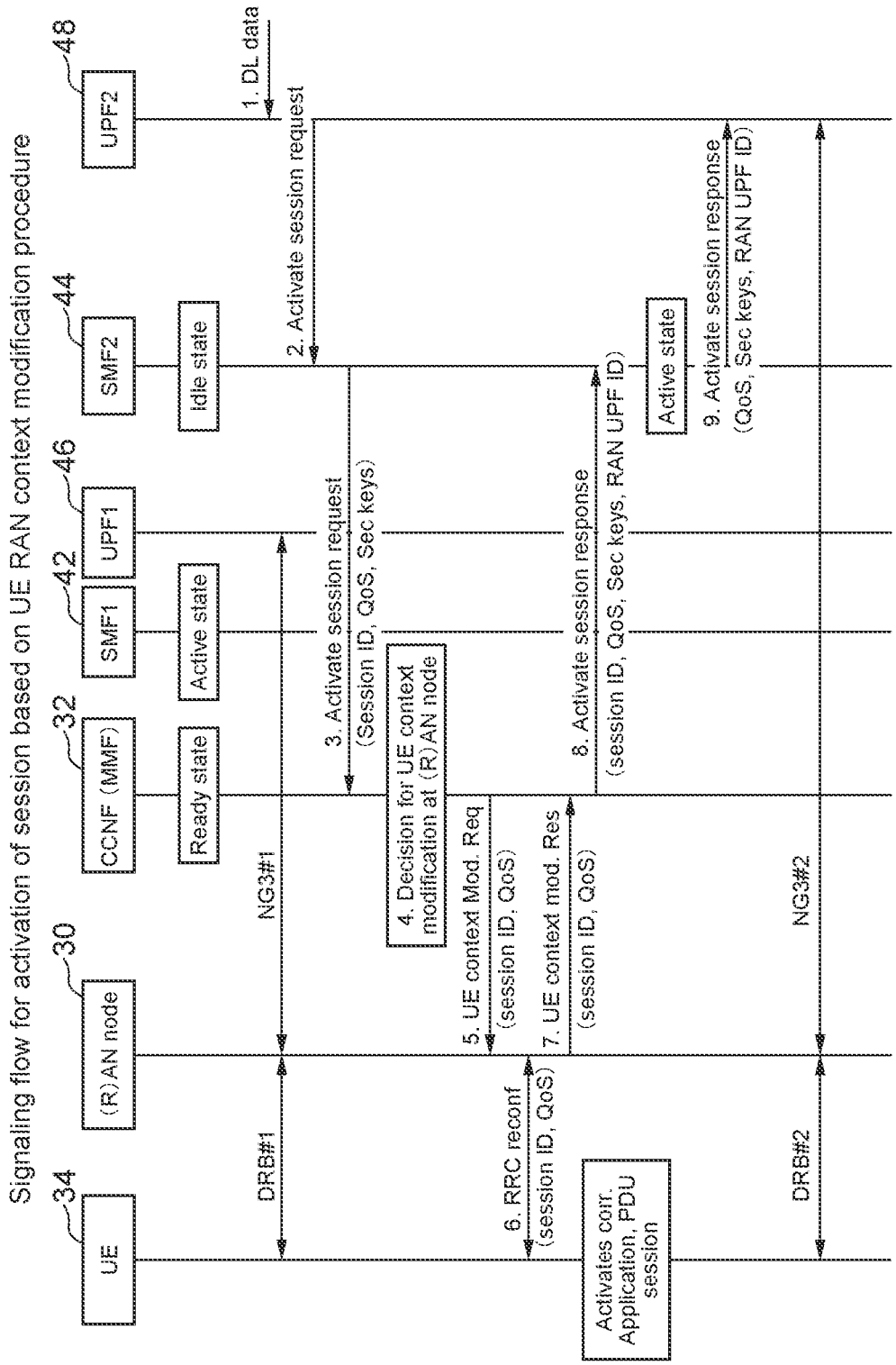
FIG. 9 shows a possible solution 2.1 for the activation of additional session when another session is already in Active state.

FIG. 9 shows a possible solution 2.1 for the activation of an additional session when another session is already in Active state. This solution 2.1 alternative is based on a new UE context modification request procedure.

The steps in FIG. 9 are described as follows:
Step (1) Similar to step (1) in FIG. 7.
Step (2) Similar to step (2) in FIG. 7.
Step (3) Similar to step (3) in FIG. 7.
Step (4) The CCNF (e.g. MMF) 32 determines that the UE 34 is in Ready mobility state. The CCNF 32 initiates a UE context modification procedure used to update the UE's context in the (R)AN node 30 with the new session parameters.

Step (5) The CCNF 32 sends for example a UE context modification request message. This message includes, in addition to other UE parameters like QoS and security parameters, also a session ID parameter received during step (3).

Step (6) The (R)AN node 30 performs a radio connection reconfiguration procedure shown as RRC connection reconfiguration in the figure. During this procedure, the (R)AN node 30 indicates the session ID parameter to the UE 34. The (R)AN node 30 can setup a new data radio bearer or can re-use an existing data radio bearer. The (R)AN node 30 takes this decision based on the QoS parameters related to the new session and the already established data radio bearer.

Based on the received session ID, the UE 34 activates the corresponding service, application or existing PDN/APN/PDU/bearer context. The UE 34 does not activate any additional existing PDN/APN/PDU/bearer contexts. With other words the UE 34 makes a linkage between the new established data radio bearer and the existing PDN/APN/PDU/bearer context based on the session ID parameter.

Step (7) The (R)AN node 30 responds to the CCNF 32. For example the (R)AN node 30 can send a UE context modification response message referring to the request in step (5).

Step (8) Similar to step (11) in FIG. 7. The SMF2 44 transfers from Idle session state to Active session state.

Step (9) Similar to step (12) in FIG. 7.

Please note that steps (13) to (15) in FIG. 7 can be performed in solution 2.1 as well (although not shown in FIG. 9).

Figure 10:
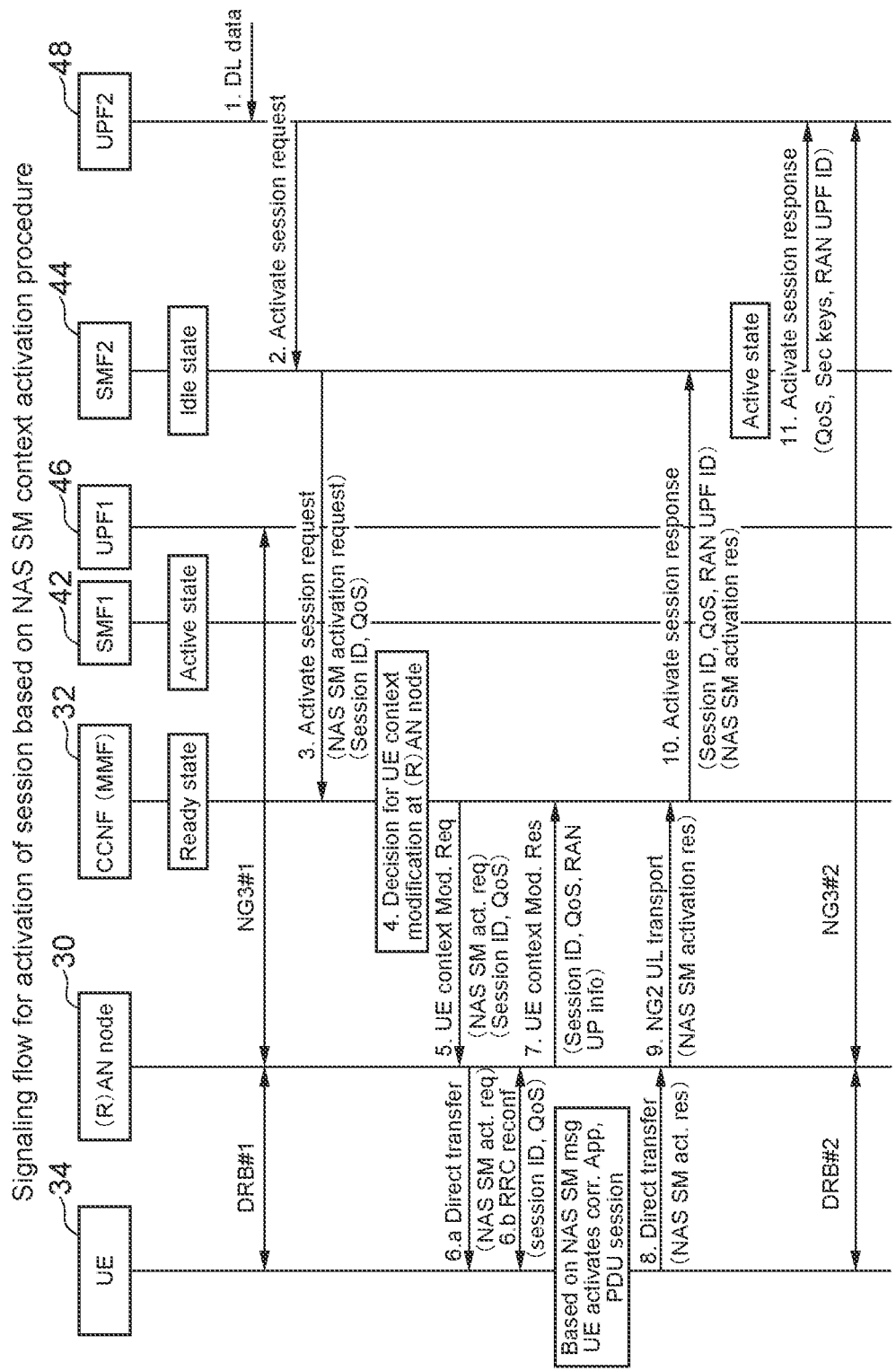
FIG. 10 shows another alternative solution 2.2 where NAS SM signalling between the SMF2 and UE is used for the activation of the session 2 towards UPF2.

FIG. 10 shows another alternative solution 2.2 where NAS SM signalling between the SMF2 44 and the UE 34 is used for the activation of the session 2 towards the UPF2 48.

The steps in FIG. 10 are described as follows:
Step (1) Similar to step (1) in FIG. 7.
Step (2) Similar to step (2) in FIG. 7.
Step (3) The SMF2 44 generates a NAS SM message (exemplary called a NAS SM Activation request) and sends it toward the UE 34. This NAS message includes a UE ID, a session ID, cause values (e.g. activation, modify, deleted) and other parameters. For the transmission of the NAS SM Activation request message to the UE 34, there can be multiple options:

(A) sent via the MMF 32 by encapsulating the NAS SM Activation request message into an Activate session request message from the SMF2 44 to the MMF 32; or (B) sent in a separate transmission/transport message between the SMF2 44 and the MMF 32; or (C) sent to a NAS front-end functionality within the CCNF 32, which forwards the message to the UE 34, i.e. the NAS SM message does not traverse through the MMF 32. In this latter case (C), the SMF2 44 needs to send another message to the MMF 32, e.g. an Activate session request message, in order to inform the MMF 32 about the need to activate the session #2 (UP connection).

Step (4) The CCNF (e.g. MMF) 32 determines that the UE 34 is in Ready mobility state and the session corresponding to "session ID" parameter needs to be activated. In addition the CCNF 32 needs to route and encapsulate the NAS SM Activation request towards the (R)AN node 30. The CCNF 32 can initiate a UE context modification procedure used to update the UE's context in the (R)AN node 30 with the new session parameters.

Step (5) The CCNF 32 sends for example a UE context modification request message. This message includes, in addition to other UE parameters like QoS parameters and security parameters, also a session ID parameter received during step (3). The CCNF 32 transmits the NAS SM Activation request towards the (R)AN node 30 either within the UE context modification request message or in another NG2 message used for transport of NAS signalling, e.g. a NG DL transport message (not shown in FIG. 10).

Step (6) This step may contain 2 independent message transmissions: step (6.a) represents an example of a Radio Resource Control (RRC) DL Direct transfer message to carry the NAS SM Activation request towards the UE 34. In step (6.b) the (R)AN node 30 performs a radio connection reconfiguration procedure shown as RRC connection reconfiguration similar to step (6) in FIG. 9.

Based on the received NAS SM Activation request, the UE 34 activates the corresponding service, application or existing PDN/APN/PDU/bearer context. The UE 34 does not activate any additional existing PDN/APN/PDU/bearer contexts. With other words the UE 34 makes a linkage between the new established data radio bearer and the existing PDN/APN/PDU/bearer context based on the session ID parameter.

Step (7) The (R)AN node 30 responds to the CCNF 32. For example the (R)AN node 30 can send a UE context modification response message referring to the request in step (5).

Step (8) The UE 34 generates a NAS SM Activation response message and sends it towards the SMF2 44. This NAS SM message can be transmitted over a RRC UL Direct transfer message.

Step (9) The (R)AN node 30 receives the RRC UL Direct transfer message, extracts the NAS SM Activation response message and forwards it to the CCNF 32.

Step (10) Similar to step (11) in FIG. 7. In addition the CCNF (MMF) 32 transfers the NAS SM Activation response message to the SMF2 44 either as part of the Activate session response message or as part of a new transfer message between the MMF 32 and the SMF2 44.

The SMF2 44 transfers from Idle session state to Active session state.

Step (11) Similar to step (12) in FIG. 7.

Please note that steps (13) to (15) in FIG. 7 can be performed in solution 2.2 as well (although not shown in FIG. 10).

Alternatively, in solution 2.2 the SMF2 44 may trigger the session activation by itself, i.e. without trigger from the UPF2 48. This is possible in case there is a scheduled session activation in the SMF2 44. Such scheduling can be based on a timer or clock running in the SMF2 44 as part of the processing of the UE's SM context in the SMF2 44. The SMF2 44, based on such a clock for scheduling, can trigger the establishment of UP connection by performing step (3) towards the MMF 32, and perform a new step to insert UP-related information towards the UPF2 48 (basically step (11) above).

In summary, solution 2.1 or solution 2.2 allows to activate an individual session (UP connection) while other UP connection exists.

Solution 3: Activation of Session Triggered by UL Data (in the UE)

While solution 1 and solution 2 (with their variants) explain the activation of the UP connection triggered by DL data (in the UPF), this solution describes the activation of a single UP connection triggered by UL data (in the UE).

Figure 11:
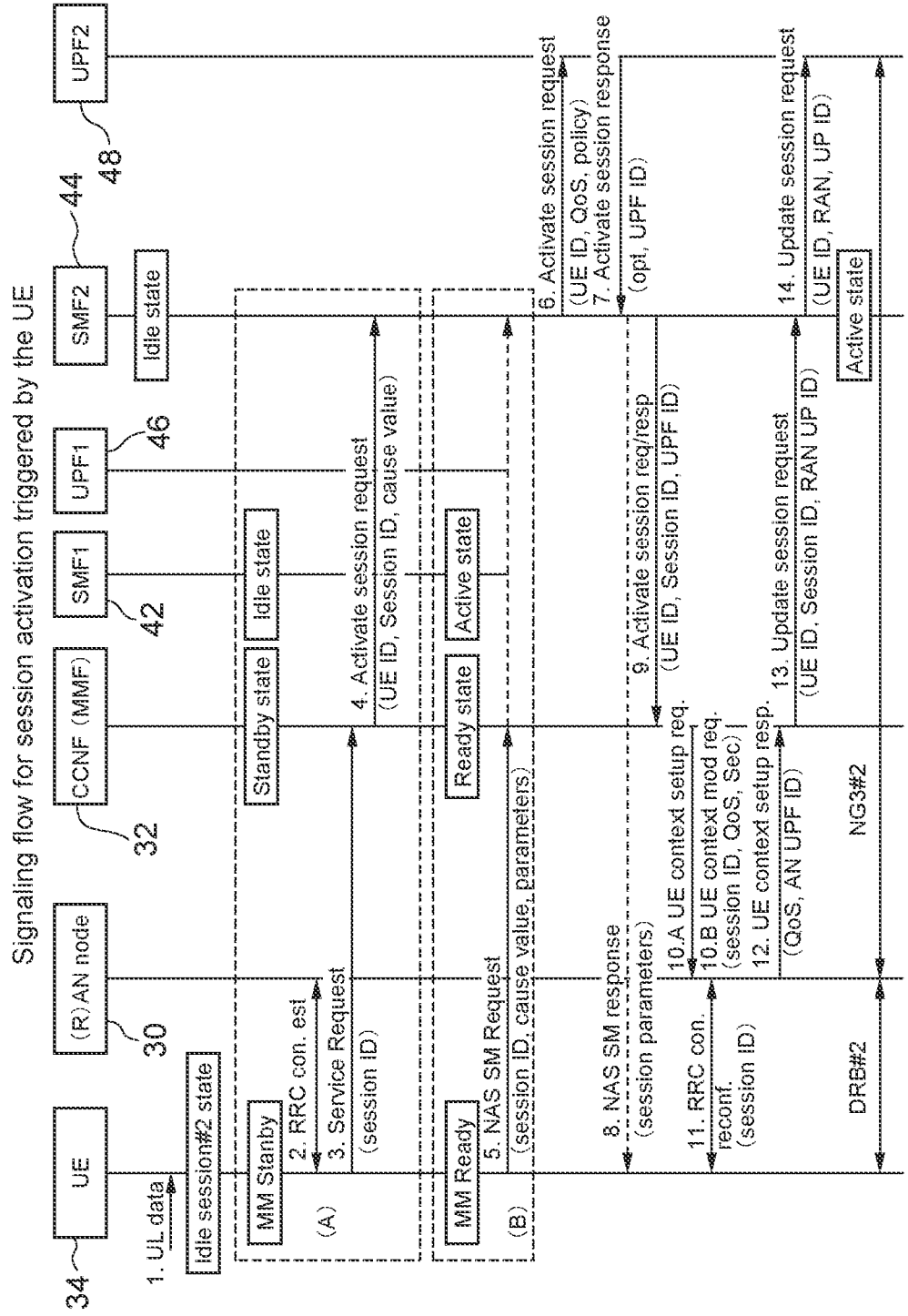
FIG. 11 shows that the UE has two session contexts for session #1 and session #2.

FIG. 11 shows that the UE 34 has two session contexts for session #1 and session #2. There are two different cases described. In case (A) the UE 34 is in Standby mobility (MM) state, and thus, all session states are in Idle state. In case (B) the UE 34 is in Ready mobility (MM) state and session #1 is in use, i.e. there are the radio connection and the NG3 connection established.

The steps in FIG. 11 are described in details as follows:

Step (1) UL data from particular App/service has to be sent by the UE 34, e.g. over session #2. As session #2 is in Idle state, the UE 34 needs to activate the UP connection in order to transmit the data.

Step (2) If the UE 34 is in MM Standby state, the UE 34 first needs to activate the radio CP connection (RRC) and the NAS connection by initiating a service request procedure. For this purpose the UE 34 first establishes RRC connection.

Step (3) If the UE 34 is in MM Standby state, the UE 34 transmits a NAS Service Request message to activate the NAS signalling connection. The NAS Service Request message can contain among others also a "session ID" parameter. If the NAS signalling connection is terminated at a NAS front-end functionality, the NAS front-end functionality forwards the NAS Service Request message to the MMF 32.

Step (4) The CCNF (e.g. MMF) 32 verifies and processes the NAS Service Request message. Based on the "session ID" parameter, the MMF 32 determines which session needs to be activated. In this particular example the MMF 32 determines that session #2 needs to be activated. The MMF 32 initiates towards the SMF2 44 a procedure for activation of the UP connection. The MMF 32 sends an Activate session request message (or a similar message as already described in step (3) in FIG. 7). This message contains among other parameters, a UE ID, a session ID, a cause value (e.g. activation, modification, delete), etc.

Step (5) If the UE 34 is in MM Ready state, the UE 34 already has a signalling connection towards the NG CN. The UE 34 can initiate a NAS connection activation procedure. For this purpose, the UE 34 sends a NAS SM session activation request message towards the corresponding SMF, in this particular example SMF2 44. The NAS SM session activation request message can be either forwarded via a common NAS front-end functionality towards the SMF2 44, or forwarded via the MMF 32 towards the SMF2 44. The NAS SM session activation request message contains among others also the parameters of the UE ID, the session ID, and/or the cause value (e.g. activation, modification, delete), etc.

Step (6) The SMF2 44 receives the messages either in step (4) or in step (5) and processes it. The SMF2 44 determines the QoS parameters and other policy parameters to be enforced in the UPF2 48. The SMF2 44 initiates a session activation procedure towards the UPF2 48. The SMF2 44 sends an Activate session request message to the UPF2 48 including among others QoS and policy parameters and optionally NG3-specific parameters (e.g. tunneling information like an IP address to be used by the UPF2 48 and/or a General packet radio service Tunneling Protocol (GTP) Tunnel Endpoint Identifier (TEID)).

Step (7) The UPF2 48 receives the Activate session request message and processes it. The UPF2 48 sends an Activate session response message to the SMF2 44 and if needed, indicates an activation result cause value and NG3-specific parameters (e.g. tunneling information like the IP address to be used by the UPF2 48 and/or the GTP TEID).

Step (8) If needed, the SMF2 44 may send a NAS SM message, e.g. a NAS SM session activation response message, to the UE 34. Such a NAS SM message can include various session management parameters, e.g. for session QoS or policy modification.

Step (9) Depending on the previous options (A) or (B), the SMF2 44 can have different behaviour. In one option, the SMF2 44 replies to step (4). In another option, the SMF2 44 may initiate a session activation procedure towards the CCNF (e.g. MMF) 32 and the (R)AN node 30. For example the SMF2 44 can send an Activate session request/response message towards the CCNF (e.g. MMF) 32 including the session ID, and UPF NG3-related information (e.g. tunneling information like the IP address of the UPF2 48 and/or the GTP TEID)

Step (10) Depending on the MM state in which the UE 34 was in the beginning, i.e. depending on options (A) and (B), the CCNF (e.g. MMF) 32 initiates different procedures:

in case of option (A), i.e. the UE 34 was in MM Standby state, the CCNF 32 initiates a UE context setup procedure towards the (R)AN node 30 by sending a UE context setup request message. This message may include among others, the session ID, QoS, security and other parameters needed for the establishment of the radio connection, e.g. UPF NG3-related information (e.g. tunneling information like the IP address of the UPF2 48 and/or the GTP TEID).

in case of option (B), i.e. the UE 34 was in MM Ready state, the CCNF (MMF) 32 initiates a UE context modification procedure towards the (R)AN node 30. The CCNF (MMF) 32 sends a UE context modification request message to the (R)AN node 30 to modify the radio connection and to assist the establishment of NG3 connection towards the UPF2 48. The UE context modification request message can contain among others, the session ID, the QoS, security and other parameters needed for the establishment of the radio connection, e.g. UPF NG3-related information (e.g. tunneling information like the IP address of the UPF2 48 and/or the GTP TEID).

Step (11) The (R)AN node 30 performs RRC connection reconfiguration to establish the data radio connection for session #2. For this purpose the (R)AN node 30 performs a RRC connection reconfiguration procedure.

Step (12) The (R)AN node 30 replies to step (10). The (R)AN node 30 sends a UE context setup response message including the (R)AN node UP NG3-related information (e.g. tunneling information like IP address of the UPF2 48 and/or GTP TEID), to the CCNF 32.

Please note that several options are possible:
option 1: The (R)AN node 30 sends the UE context setup response message to the MMF 32.
option 2: The (R)AN node 30 sends the UE context setup response message to a NG2 front-end functionality within the CCNF 32. The front-end functionality can forward the content of the UE context setup response message to the MMF 32 and/or the SMF2 44.
option 3: The (R)AN node 30 sends the UE context setup response message to the SMF2 44.
option 4: The (R)AN node 30 sends 2 different messages to the MMF 32 and the SMF2 44. The message to the MMF 32 confirms the successful establishment of the new data radio connection, whereas the message to the SMF2 44 carries in addition (R)AN node UP NG3-related information (e.g. tunneling information like the IP address of the UPF2 48 and/or the GTP TEID)

Step (13) In case of option 1 from step (12) above, the MMF 32 initiates a session update procedure towards the SMF2 44 in order to update the (R)AN node UP NG3-related information (e.g. tunneling information like the IP address of the UPF2 48 and/or the GTP TEID).

Step (14) The SMF2 44 initiates a session update procedure towards the UPF2 48. The SMF2 44 sends a Update session request message to the UPF2 48 including the (R)AN node UP NG3-related information (e.g. tunneling information like the IP address of the UPF2 48 and/or the GTP TEID).

Solution 4: Deactivation of Single Session while Other Session(s) Continue to be in Active State Solution 4.1: Session Deactivation Initiated by the RAN Node In order to manage sessions independently (i.e. per session basis), it shall be possible to release the UP connection of a single session (called "session deactivation" in this document). With other words a single radio connection and a NG3 connection can be released, while keeping the remaining existing session's connection active.

In one alternative solution it is assumed that (R)AN node 30 triggers the deactivation of a session. Usually the (R)AN node 30 manages radio related parameters, such as a UE inactivity timer, an active discontinuous reception (DRX) cycle, an idle DRX cycle, etc. This solution proposes that such radio parameters are maintained per session. With this, if multiple radio connections for multiple sessions are activated, the (R)AN node 30 maintains a so called "session inactivity timer" per activated session. This "session inactivity timer" is different from the UE inactivity timer, as the "session inactivity timer" applies to a single session (a radio connection like a data radio bearer (DRB) in LTE).

Figure 12:
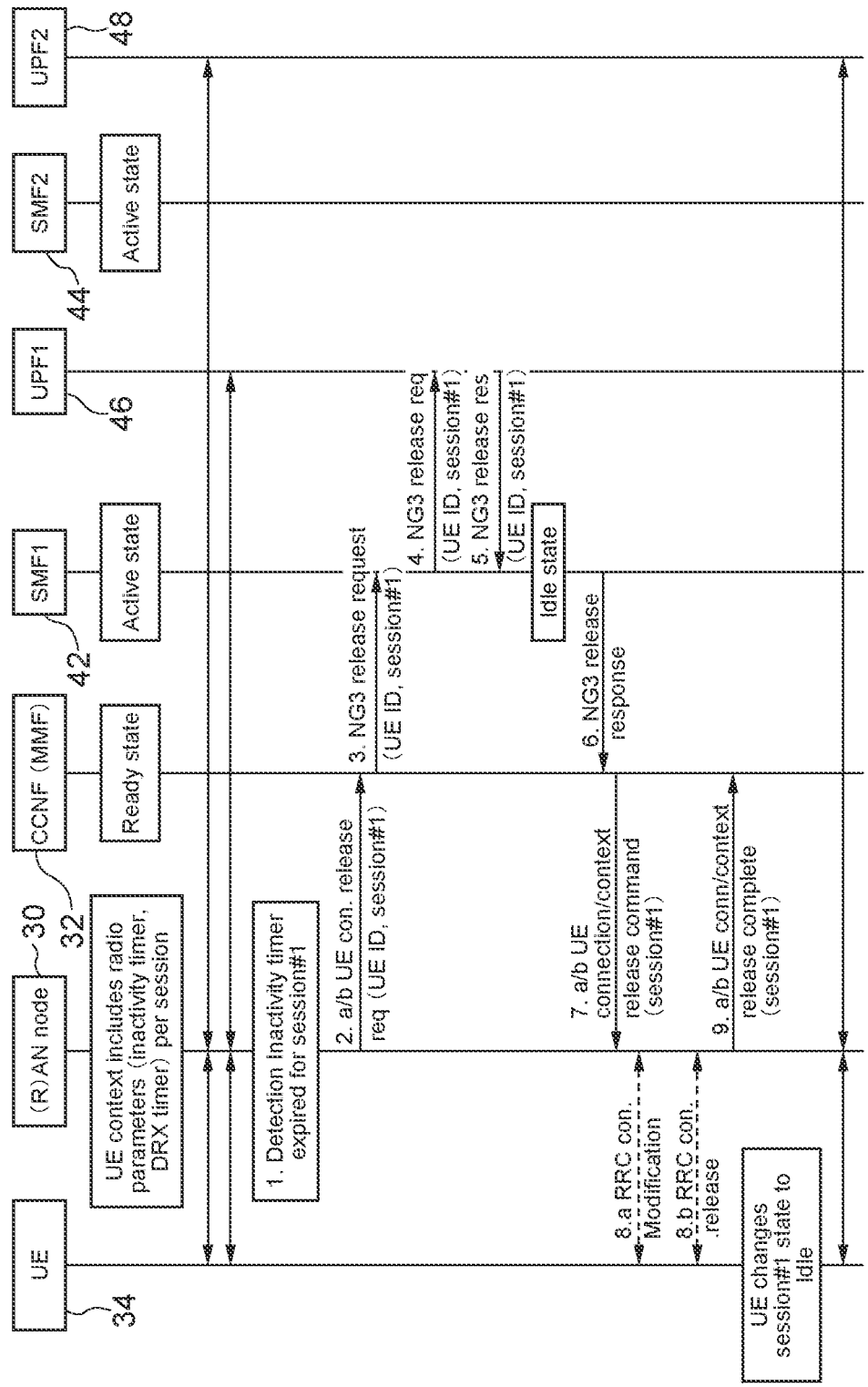
FIG. 12 describes a case where two sessions are Active and one of them becomes Idle due to no user plane activity within predefined UE inactivity period determined by the (R)AN node.

FIG. 12 describes a case where two sessions are Active and one of them becomes Idle due to no user plane activity within a predefined UE inactivity period determined by the (R)AN node 30. As starting point, the thick arrows show the data flow in UL and DL between the UE 34 and, the UPF1 46 and the UPF2 48 correspondingly.

The steps in FIG. 12 are described as follows:

Step (1) The UE Inactivity timer in the (R)AN node 30 expires for the session #1. It means that the (R)AN node 30 has determined that no data has been transmitted in the UL or the DL for a given period of time denoted as the "inactivity timer" for session #1.

Step (2) The (R)AN node 30 has 2 options depending on the number of remaining active sessions (or radio connections).

Option (2.a) If this is not the last active session, (R)AN node 30 initiates a UE connection release procedure towards the CCNF 32. The (R)AN node 30 sends a UE connection release request message to the CCNF 32. This message includes a UE temporary/permanent ID, an indication which session has to be deactivated (e.g. session #1), a cause value and other parameters.

Option (2.b) If this is the last active session (e.g. existing radio connection), the (R)AN node 30 initiates a UE context release procedure. This would enforce change of the mobility (MM) state from Ready to Standby. This message includes a UE temporary/permanent ID, an indication about a cause value and other parameters.

Step (3) The CCNF 32 processes the UE connection release request message and determines which SMF needs to be contacted. The CCNF 32 sends a NG3 release request to the SMF1 42. Please note that this message can be also called a Deactivate session request. The meaning is that the NG3 connection/tunnel should be released, but the UE's context in the SMF1 42 should be kept and transferred from Active to Idle. This message includes the UE temporary/ permanent ID, the indication for the specific session ID (e.g. session #1) and other parameters.

Step (4) The SMF1 42 sends a NG3 release request message to the UPF1 46. This message includes the UE temporary/permanent ID, an indication for the specific session ID (e.g. session #1) and other parameters. The UPF1 46 releases all associated resources to session #1 with regard to the NG3 reference point.

Step (5) The UPF1 46 sends a NG3 release response message to the SMF1 42 including the UE ID, the session ID and other parameters. At this point, the SMF1 42 change session status from Active to Idle.

Step (6) The SMF1 42 sends a NG3 release response message to the CCNF 32 including the UE ID, the session ID and other parameters.

Step (7) The CCNF 32 has two alternatives depending on the number of remaining active sessions.

Option (7.a) If this is not the last active session, the CCNF 32 sends a UE connection release command message to the (R)AN node 30 including the UE ID, the session ID and other parameters. This message has information that indicates that only session #1 is to be deactivated.

Option (7.b) If this is the last active session, the CCNF 32 sends a UE context release command message to the (R)AN node 30 including the UE ID, the session ID and other parameters. This message has information that indicates that only session #1 is to be released.

Step (8) There are 2 alternatives possible depending on the number of remaining active sessions and instruction from the CCNF 32:

Option (8.a) The (R)AN node 30 performs a RRC connection modification procedure. For this purpose the (R)AN node 30 sends a RRC connection reconfiguration message to the UE 34 in order to release an associated data radio connection to the session #1. Other active radio connection(s) are not released.

Option (8.b) The (R)AN node 30 performs a RRC connection release procedure if this is the last existing radio connection for the UE 34. For this purpose the (R)AN node 30 sends a RRC connection reconfiguration message to the UE 34 in order to release an associated radio connection to the session #1.

If Option (8.a) has been performed, the UE 34 transfers the state of the corresponding session (e.g. session #1) from Active to Idle state.

It is important to mention that in the UE 34, the session #1 context is not deleted, but kept in Idle state, while other session states may be in Active states.

Step (9) The (R)AN node 30 sends either (9.a) a UE connection release complete message to the CCNF 32 or (9.b) a UE context release complete message to the CCNF 32.

Assuming that the deactivated session #1 is not the last active sessions, FIG. 12 shows at the bottom that the radio connection and the NG3 connection/tunnel for session #2 are kept after performing the deactivation procedure for session #1.

Solution 4.2: Session Deactivation Initiated by the UPF

Figure 13:
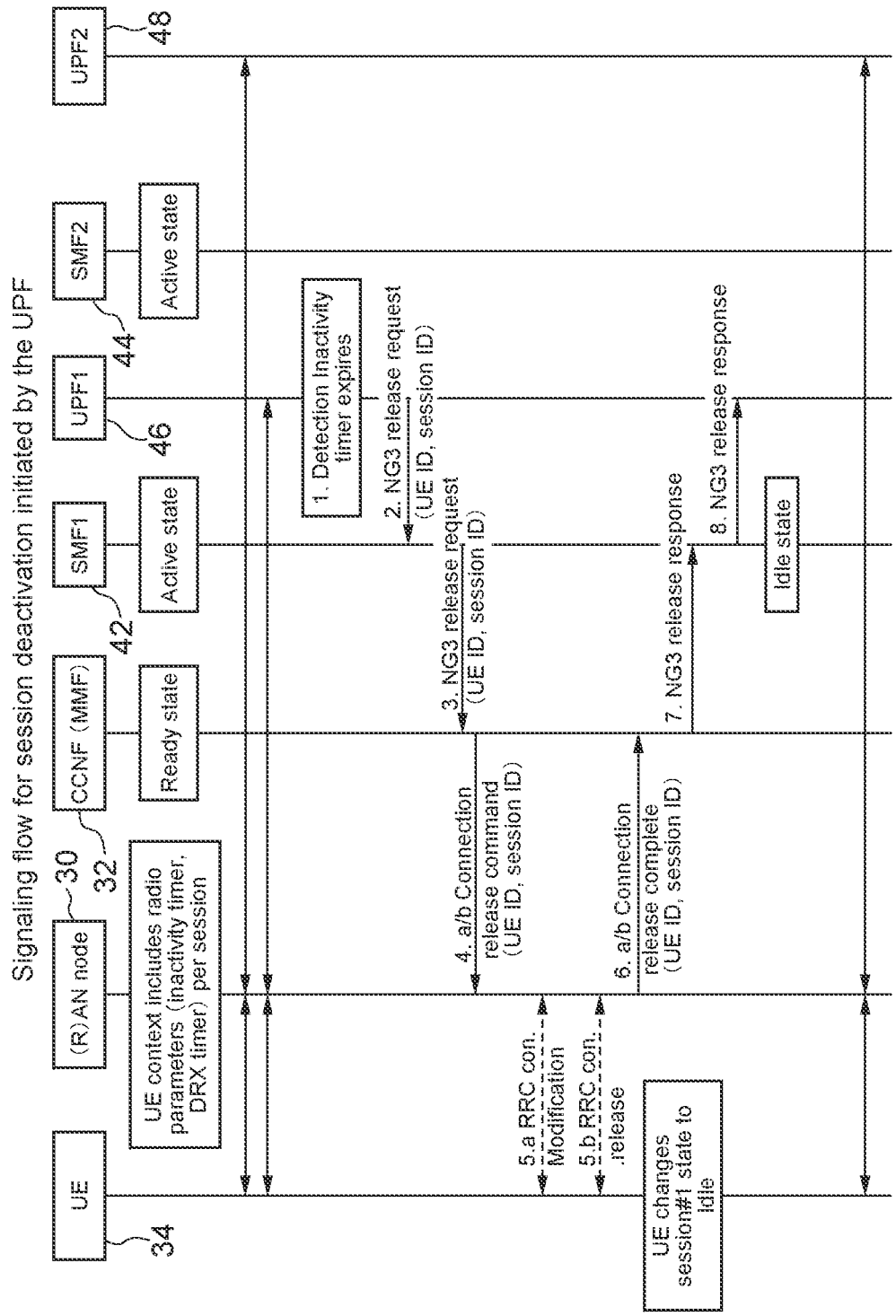
FIG. 13 describes an alternative solution where the session deactivation procedure is initiated by the UPF of the corresponding session.

FIG. 13 describes an alternative solution where the session deactivation procedure is initiated by the UPF of the corresponding session. This solution proposes that each UPF manages an inactivity timer, which can be called a "session inactivity timer". This timer can be configured by the SMF when a session is activated, e.g. step (12) in FIG. 7 or in FIG. 8 can contain a "session inactivity timer" parameter. The UPF measures the time for which there are no DL or UL data exchanged. When the measured time for data inactivity reaches the value of the parameter "session inactivity timer", the UPF triggers a UP connection release procedure.

As a starting point, the UE 34 is in MM Ready state and session #1 and session #2 are activated. This is shown by the thick arrows corresponding to 2 radio connections and 2 NG3 connections between the (R)AN node 30 and, the UPF1 46 and the UPF2 48 correspondingly.

The steps in FIG. 13 are described as follows:

Step (1) The UPF1 46 detects that the session inactivity timer expires. It means that the UPF1 46 has determined that no data has been transmitted in the UL or DL for a given period of time denoted as the "inactivity timer" for session #1.

Step (2) The UPF1 46 initiates a release request procedure for the UP connection towards the (R)AN. The UPF1 46 sends a NG3 release request message (or similar message e.g. a Deactivate session request or a Release connection request) to the SMF1 42. This message can contain a UE ID, a session ID, a cause value and other parameters.

Step (3) The SMF1 42 initiates a UP connection release procedure. The SMF1 42 sends a NG3 release request message (or a similar message e.g. a Deactivate session request or a Release connection request) to the CCNF 32. This message can contain the UE ID, the session ID, the cause value and other parameters.

Step (4) The CCNF (e.g. MMF) 32 has 2 options depending on the number of remaining active sessions (or radio connections)

Option (4.a) If this is not the last active session, the CCNF 32 initiates a UE connection release procedure towards the (R)AN node 30. The CCNF 32 sends a UE connection release request message to the (R)AN node 30. This message includes a UE temporary/permanent ID, indication which session has to be deactivated (e.g. session #1) and other parameters.

Option (4.b) If this is the last active session (e.g. there are no more active sessions and corresponding radio or NG3 connections), the CCNF 32 initiates a UE context release procedure. This would enforce change of the mobility (MM) state from Ready to Standby.

Step (5) There are 2 alternatives possible depending on the number of remaining active sessions and instruction from the CCNF 32:

Option (5.a) The (R)AN node 30 performs a RRC connection modification procedure. For this purpose the (R)AN node 30 sends a RRC connection reconfiguration message to the UE 34 in order to release an associated radio connection to the session #1. It is assumed that the radio data bearer/connection to be released have 1-to-1 association with the NAS SM context corresponding with the session to be deactivated. Also, the radio signalling over RRC contains an indication about the session to be deactivated (session ID). Other active radio connection(s) are not released.

Option (5.b) The (R)AN node 30 performs a RRC connection release procedure if this is the last existing radio connection for the UE 34. For this purpose the (R)AN node 30 sends a RRC connection reconfiguration message to the UE 34 in order to release an associated radio connection to the session #1.

If Option (5.a) has been performed, the UE 34 transfers the state of the corresponding session (e.g. session #1) from Active to Idle state.

Step (6) The (R)AN node 30 sends either (6.a) a UE connection release complete message to the CCNF 32 or (6.b) a UE context release complete message to the CCNF 32.

Step (7) The CCNF 32 replies to the UP connection release procedure in step (3). The CCNF 32 sends a NG3 release response message (or a similar message e.g. a Deactivate session response or a Release connection response) to the SMF1 42. This message can contain the UE ID, the session ID, the cause value and other parameters.

Step (8) The SMF1 42 replies to the UP connection release procedure in step (2). The SMF1 42 sends a NG3 release response message (or a similar message e.g. a Deactivate session response or a Release connection response) to the UPF1 46. This message can contain the UE ID, the session ID, the cause value and other parameters.

At this point, the SMF1 42 change session status from Active to Idle.

Another alternative to solution 4.2 would be to use a NAS SM Session deactivation procedure between the SMF1 42 and the UE 34. This procedure can be used by the SMF1 42 to inform the UE 34 about the SM context deactivation, which results in changing the session SM state in the UE 34 from Active to Idle. Such a NAS SM procedure can be initiated by the SMF1 42 in parallel to steps (3), (4) and (5) in FIG. 13.

Solution 4.3: Session Deactivation Initiated by the UE

This is another alternative way of session deactivation (i.e. release of UP connection) where the procedure is initiated by the UE 34. Since the UE 34 can be aware about the Applications running on higher layers, the UE 34 may know whether an application has finished with the data transfer. If such an indication is available from the higher layers to the NAS layer, then the NAS layer in the UE 34, specifically the NAS SM part, can initiate a session deactivation procedure towards the NG CN.

In a particular example, if an Application associated with session A indicates to the NAS SM instance in the UE 34 that such an application does not need any more UP connections, or the NAS SM instance is aware by any means that the active UP connection is not used, the UE's NAS SM instance for session A can initiate session deactivation procedure towards the NG CN. The following steps can be performed:

Step (1) The UE 34 initiates a NAS SM Session deactivation procedure towards the SMF1 42 in order to inform the SMF1 42 that the UP connection can be released. The UE 34 generates a NAS SM Deactivation session request message and sends it over NAS signaling towards the NG CN. This message includes besides the usual NAS SM parameters an indication about the UP connection deactivation and session ID. The NG CN processes the message and forwards it to the corresponding SMF1 42.

Step (2) The SMF1 42 initiates a NG3 release procedure towards the UPF1 46.

Step (3) The SMF1 42 initiates a NG3 release request (or a Deactivate session request) procedure towards the CCNF (e.g. MMF) 32.

Step (4) The MMF 32 processes the NG3 release request message from the SMF1 42. The MMF 32 initiates the NG3 release procedure (or the Deactivate session procedure) towards the (R)AN node 30.

Step (5) The (R)AN node 30 performs the NG3 release procedure (or the Deactivate session procedure) towards the UE 34, e.g. via a RRC connection modification procedure. The (R)AN node 30 also modifies the context of the UE 34 by deleting the NG3 parameters of the corresponding UPF node. The (R)AN node 30 replies to the MMF 32 with the result of the NG3 release procedure.

Step (6) The MMF 32 changes the status of the corresponding session to Idle. The MMF 32 replies to the SMF1 42 with the result of the NG3 release procedure.

Step (7) The SMF1 42 acknowledges the NAS SM Session deactivation request message in step (1).

Please note that the steps (2)-(6) above are similar to steps (3)-(7) in solution 4.2 shown in FIG. 13. The major difference from solution 4.3 compared to 4.2 is the NAS SM Session deactivation procedure performed between the UE 34 and the SMF1 42.

The descriptions below apply to all solutions described in this document.

The examples above describe solutions for the activation or deactivation of a single session. However, it is also possible to activate/deactivate several sessions simultaneously by including several Session IDs in the corresponding messages. The activation of several sessions simultaneously can be beneficial in case of multiple PDU sessions per data network, where it is assumed that the same SMF controls the multiple PDU sessions. In one alternative, the SMF decides whether to activate a single PDU session (e.g. to which DL data arrives) or to activate some or even all PDU session controlled by this SMF (which probably means some or all PDU sessions toward a particular network slice or data network).

Please note that the signalling to/from the (R)AN node 30 over NG2 interface can be terminated at a common front-end NG2 termination functionality in the CCNF 32. The common front-end NG2 functionality can route/forward the content of the NG2 message to the MMF 32 and/or the SMF2 44. Further, it is possible that the (R)AN node 30 sends 2 different NG2 messages, a separate message to the MMF 32 and a separate message to the SMF2 44. The message to the MMF 32 may request an MM-specific action or can confirm the successful establishment/release of a data radio connection. The message to the SMF2 44 can mainly contain (R)AN node UP NG3-related information (e.g. tunneling information like the IP address of UPF2 48 and/or the GTP TEID).

Please note that all figures above show scenarios of a single UPF per session. However, this document is applicable to scenarios with multiple different UPFs served by a single SMF. In such case it can be assumed that there are multiple PDU sessions for the same data network. The sessions can be activated independently for each UPF. In such case, an activated session exists to another UPF served by the same SMF2 44 (i.e. the UE 34 is in Ready mobility state and the SMF2 44 is in Active session state). Then the SMF2 44 doesn't need to initiate paging procedure, but instead the SMF2 44 can either modify existing session or initiate the activation on new UP session. For this purpose the SM requests the CCNF (MMF) 32 to add a new UP session including the UPF2 48 information.

Co-location of control plane functions like the MMF and the SMF in a common control plane functional entity is possible.

The proposed solution is based on the following principles:

The session management function (SMF) and mobility management function (MMF) are split in different network functions. In the particular case of UE registered with multiple network slice instances, the UE would be served by multiple SMFs, i.e. multiple PDU session are established.

Multiple PDU sessions (to the same or to different network slices) are established for a given UE. A PDU session can be in Idle state or Active state.

A UP connection (including data radio connection and NG3 tunnel establishing) can be activated for a single PDU session. UP connections for other PDU sessions (to the same or to other network slices) can be activated/deactivated independently.

The procedures for PDU session activation and deactivation are proposed, meaning:

PDU session activation is the transition to "Active" session state in the SMF and the UP connection is established;

PDU session deactivation is the transition to "Idle" session state in the SMF and the UP connection is released.

General Nodes Description

The description below applies to all solutions described in this document.

UE Impact

Please note that the solutions in this document are mostly described including the UE as NG UE, but it is also possible to apply the solution to 2G, 3G and 4G access system, i.e. when the UE is 2G/3G/4G UE.

According to the above described example embodiments, the UE 34 is modified to be able to handle the signaling to/from the (R)AN and CN functional entities (e.g. (R)AN node, MMF, SMF). In addition, the UE 34 is able to receive, process and transmit the corresponding information to the (R)AN and CN functional entities. The UE 34 can be described schematically via the block diagram as in FIG. 14.

Figure 2:
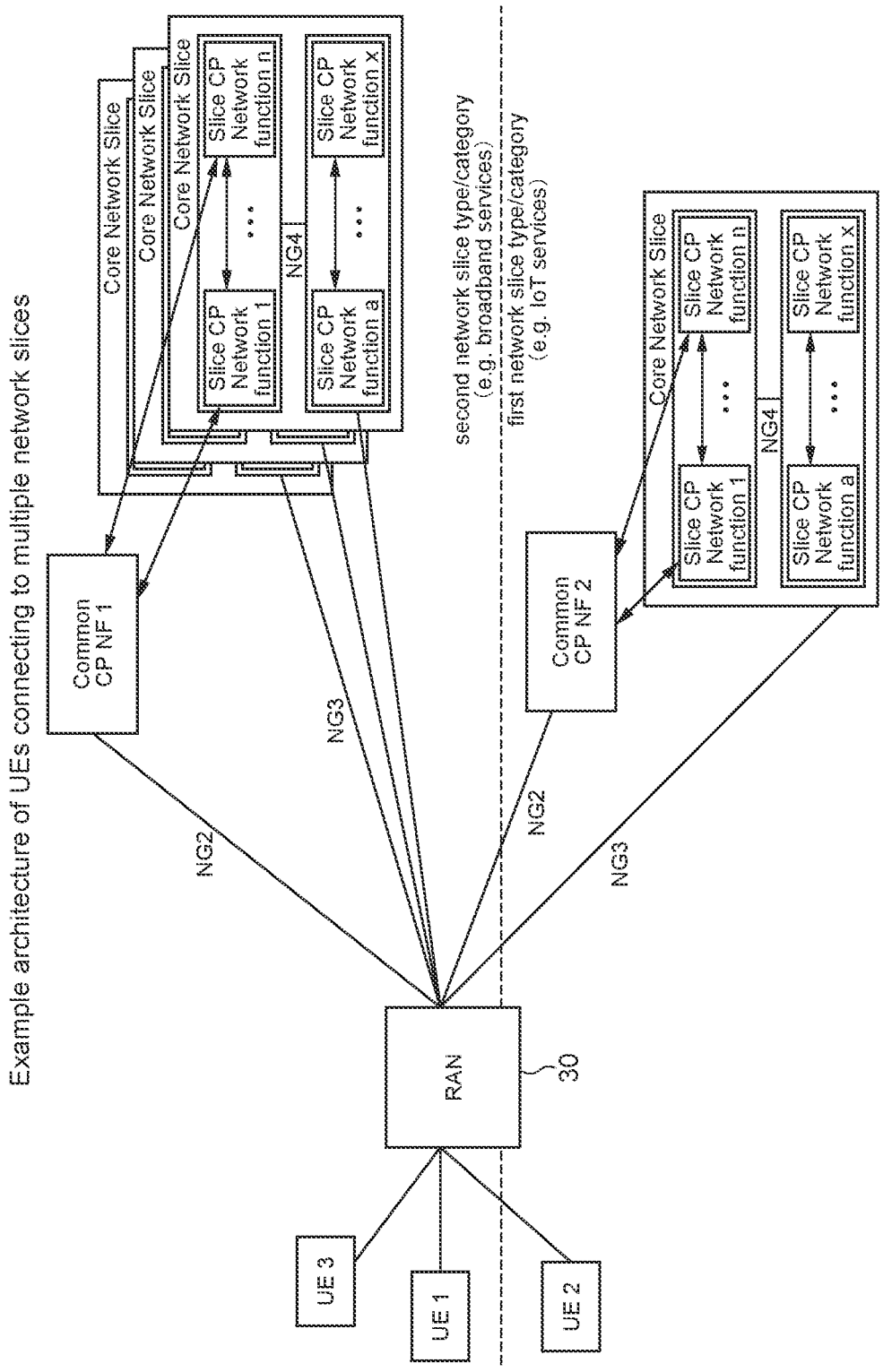
FIG. 2 shows one example of network architecture allowing a UE to connect to multiple NSIs.
Figure 3:
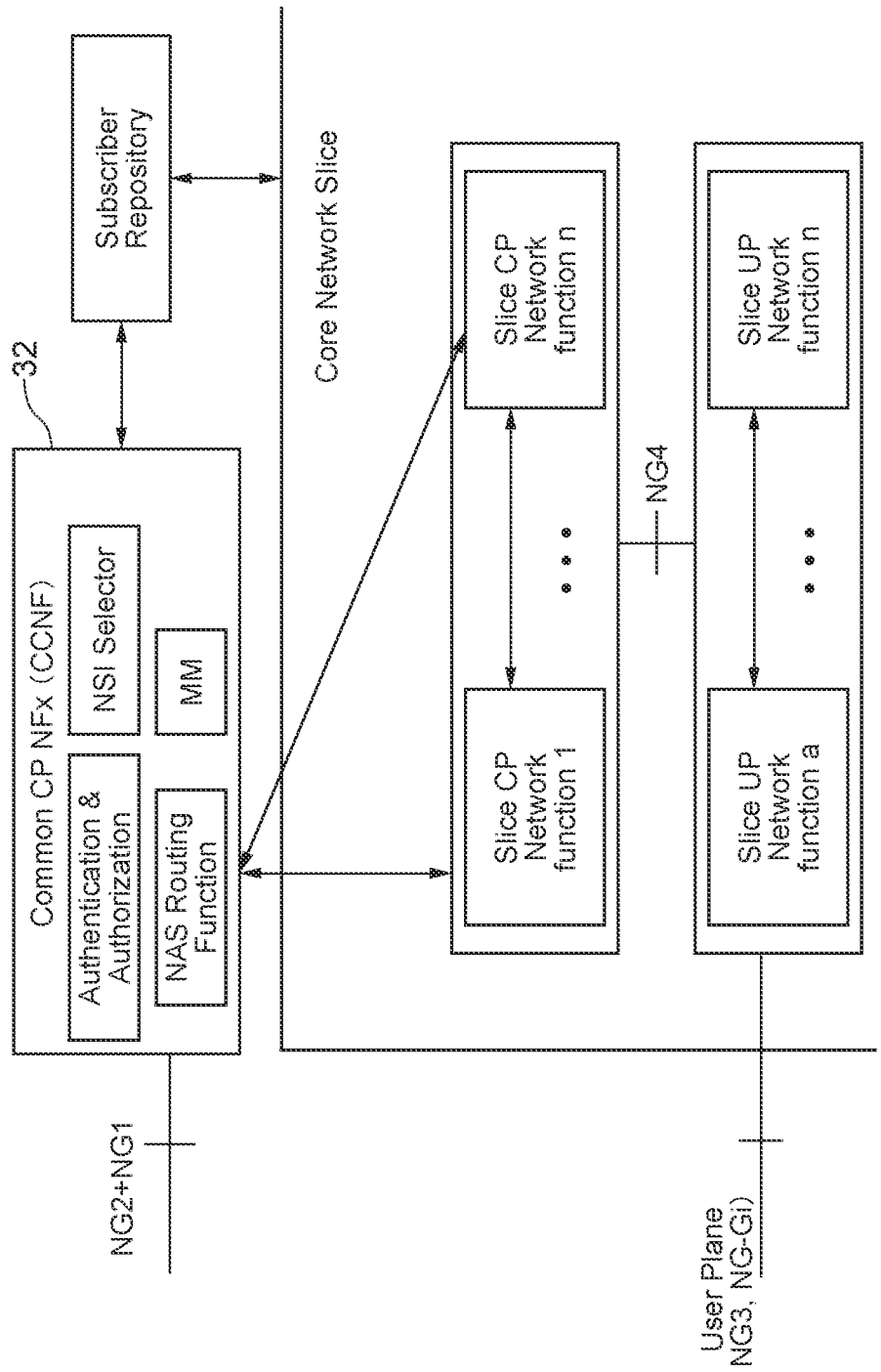
FIG. 3 describes the CCNF and SCNF.
Figure 4:
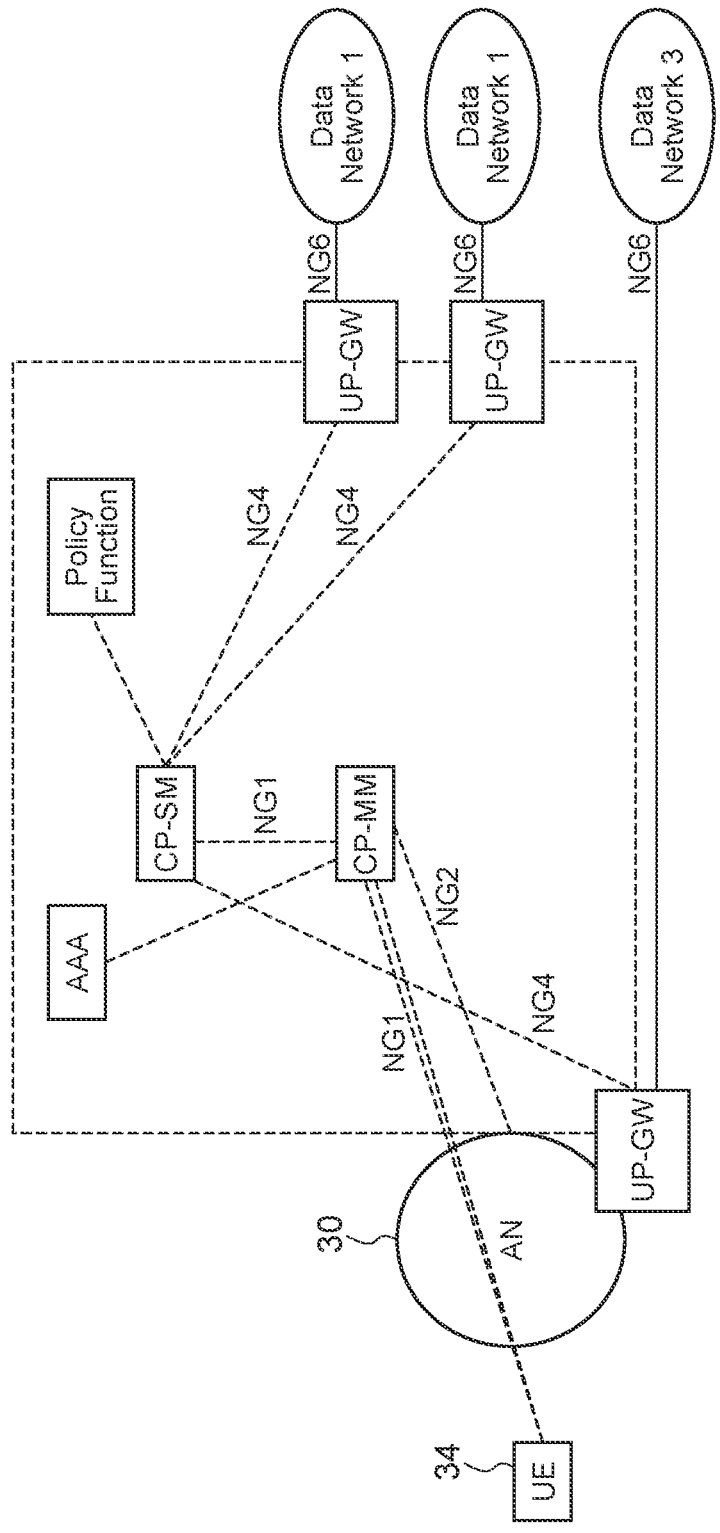
FIG. 4 shows one further solution described in 23.799 in clause 6.4.3.
Figure 14:
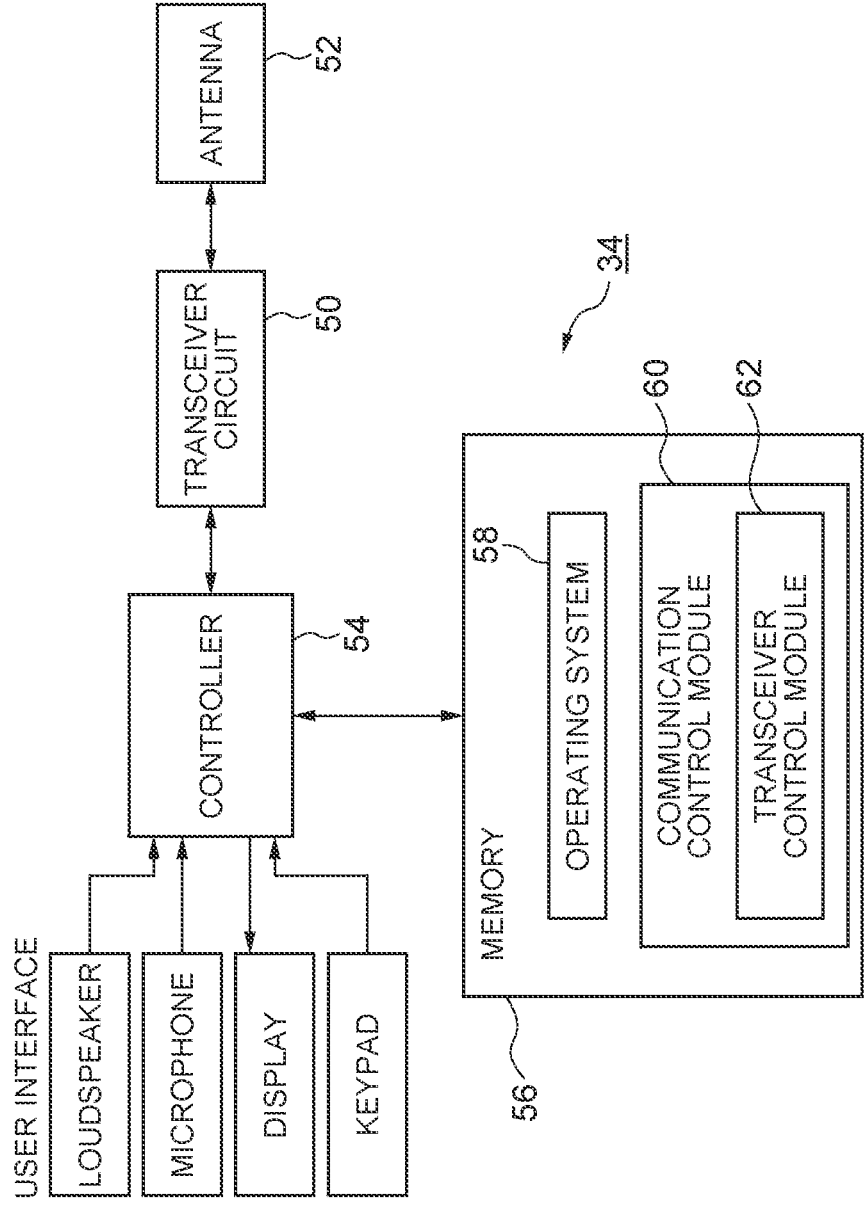
FIG. 14 is a block diagram illustrating the main components of the UE shown in FIG. 1.

FIG. 14 is a block diagram illustrating the main components of the user equipment (UE) 34 shown in e.g. FIG. 1 (where it is denoted 'NG UE'). As shown, the UE 34 has a transceiver circuit 50 that is operable to transmit signals to and to receive signals from a radio access network node 30 via one or more antenna 52. Such radio access network node 30 (denoted 'NG (R)AN' in FIG. 1, 'RAN' in FIG. 2, and 'AN' in FIG. 4) may comprise a base station and/or any other suitable access point/transmission point. The UE 34 has a controller 54 to control the operation of the UE 34. The controller 54 is associated with a memory 56 and is coupled to the transceiver circuit 50. The UE 34 may have all the usual functionality of a conventional mobile device/mobile telephone (such as a user interface) and this may be provided by any one or any combination of hardware, software and firmware, as appropriate. Software may be pre-installed in the memory 56 and/or may be downloaded via the telecommunication network or from a removable data storage device (RMD), for example.

The controller 54 controls overall operation of the UE 34 by, in this example, program instructions or software instructions stored within the memory 56. As shown, these software instructions include, among other things, an operating system 58, a communication control module 60, and a transceiver control module 62 (shown as forming part of the communication control module 60).

The communication control module 60 controls the communication between the UE 34 and the base station/access node of the (R)AN. The communications control module 60 also controls the separate flows of control data (Control Plane) and user data (User Plane, both uplink and downlink) that are to be transmitted to the base station/access node and other nodes (via the base station/access node) such as the Mobility Management Function (MMF) and the Session Management Function (SMF).

MMF/SMF Impact

According to the above described example embodiments, the Mobility Management Function (MMF) or Session Management Function (SMF) is modified/extended to be able to behave according to the proposed solution(s). The MMF or the SMF can be described schematically via the block diagram as in FIG. 15.

Figure 15:
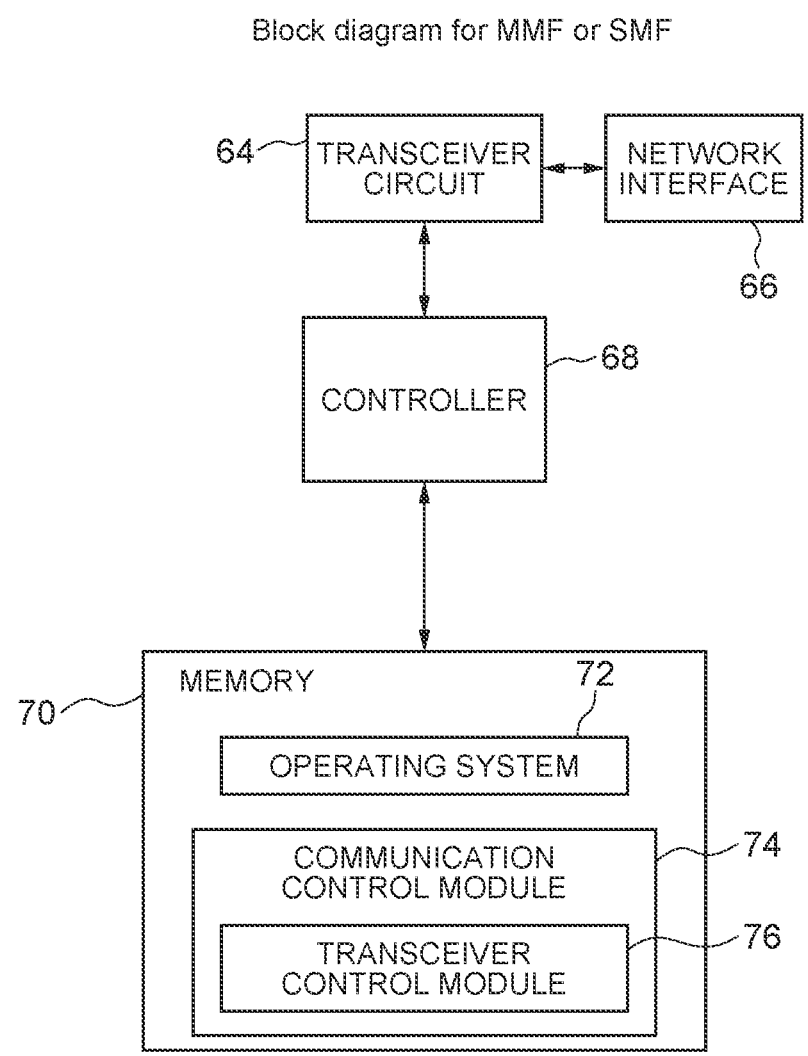
FIG. 15 is a block diagram illustrating the main components of the MMF/SMF node shown in FIG. 1.

FIG. 15 is a block diagram illustrating the main components of the Mobility Management Function (MMF)/Session Management Function (SMF) node shown in e.g. FIG. 1. Although the MMF and the SMF are shown as part of a combined control function entity, their functionalities may be implemented in separate nodes.

As shown, the MMF/SMF has a transceiver circuit 64 and a network interface 66 for transmitting signals to and for receiving signals from other network nodes (including the UE 34). The MMF/SMF has a controller 68 to control the operation of the MMF/SMF node. The controller 68 is associated with a memory 70. Software may be pre-installed in the memory 70 and/or may be downloaded via the communication network or from a removable data storage device (RMD), for example. The controller 68 is configured to control the overall operation of the MMF/SMF by, in this example, program instructions or software instructions stored within the memory 70. As shown, these software instructions include, among other things, an operating system 72, a communication control module 74, and a transceiver control module 76 (shown as forming part of the communication control module 74).

The communication control module 74 controls the communication between the MMF/SMF and other network entities that are connected to the MMF/SMF (e.g. the base station/access node, and the UE 34 when connected to a base station/access node).

Summary

Beneficially, the above described example embodiments include, although they are not limited to, one or more of the following functionalities.

1) The UE is able to link a data radio connection activation or deactivation procedures with an existing PDU session management context in the UE.

a. Such a linkage in the UE is based on a session ID indication carried in the related signalling from the SMF to the UE.

2) The user plane connection deactivation is performed by the session management function in the NG CN triggered:

a. either by the user plane function in the core network; or b. by the UE via NAS SM signaling.

It can be seen that the above example embodiments describe a method for independent activation or deactivation of a user plane connection per PDU session or network slice, the method comprising:

1) The activation or deactivation of a user plane connection is initiated from the SMF based on:

a. Trigger from the UPF (due to arriving of DL data for session activation or due to timer expiration for session deactivation);

b. Trigger from the UE (due to UL data transmission for session activation, or due to no need of UP connection for session deactivation).

2) The control plane session management function, mobility management function, access network and terminal use a session ID as a reference ID to refer to the same session.

Benefits

It can be seen that the above embodiments provide a number of benefits, including, but not limited to:

(1) The number of active NG3 connections is limited even if there are multiple user plane functions instantiated/configured for a UE, which also limits the signaling over radio and NG2 and NG3 interface in case of UE mobility.

(2) If the UE receives or transmits data over single particular session, the user plane connection only to this particular session is activated, which reduces the signaling for connection establishment for other sessions if frequent mobility state changes between Standby and Ready states happen.

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

In the above description, the UE and the MMF/SMF node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above example embodiments, a number of software modules are described. As those skilled in the art will appreciate, the software modules may be provided in compiled or un-compiled form and may be supplied to the UE and the MMF/SMF node as a signal over a computer network, or on a recording medium. Further, the functionality performed by part or all of this software may be performed using one or more dedicated hardware circuits. However, the use of software modules is preferred as it facilitates the updating of the UE and the MMF/SMF node in order to update their functionalities.

Various other modifications will be apparent to those skilled in the art and will not be described in further detail here.

LIST OF ABBREVIATIONS

3GPP: 3rd Generation Partnership Project
AS: Access Stratum (use similar to RRC signaling in this document)
CCF: Core Control Functions
CCNF: Common Control Network Functions
CPF: Control Plane Function
NB, eNB: Node B, evolved Node B (but can also be any 'RAN node' implementing 2G, 3G, 4G or future 5G technology)
E-UTRAN: Evolved Universal Terrestrial Radio Access Network (also used as EUTRAN)
GGSN: Gateway GPRS Support Node
GPRS: General Packet Radio Service
HPLMN: Home Public Land Mobile Network
HSS: Home Subscriber Server
IE: Informational Element (used as part of a signalling message)
MME: Mobility Management Entity
MMF: Mobility Management Function
MNO: Mobile Network Operator
NAS: Non Access Stratum
NFV: Network Function Virtualization
NNSF: NAS/Network Node Selection Function
NSI: Network Slice Instances
PCF: Policy Control Function
PCRF: Policy and Charging Rules Function
PGW: Packet Data Network Gateway
PSM: Power Saving Mode
RAU: Routing Area Update
RNC: Radio Network Controller
RRC: Radio Resource Control
PLMN: Public Land Mobile Network
SCNF: Slice-specific Control Plane Network Functions
SMF: Session Management Function
SGSN: Serving GPRS Support Node
SGW: Serving Gateway
TAU: Tracking Area Update
UE: User Equipment
UPF: User Plane Function (any UP function used for policy/QoS enforcement, mobility, UE's IP anchor, similar to SGW/PGW in EPC)
UTRAN: UMTS Terrestrial Radio Access Network
VPLMN: Visited Public Land Mobile Network This application is based upon and claims the benefit of priority from European Patent application No. EP 16185042.5, filed on Aug. 19, 2016, the disclosure of which is incorporated herein in its entirety by reference.

The invention claimed is:

1. A controlling method in User Equipment (UE), comprising:
   transmitting, to a network node for mobility management via an Access Network (AN) node, information in a Non Access Stratum (NAS) Service Request message, wherein the information includes a first Protocol Data Unit (PDU) session identifier (ID) of a first PDU session to be activated, and wherein the first PDU session ID relates to uplink user data pending for the first PDU session.

2. The controlling method according to claim 1, further comprising:
   receiving a message for Radio Resource Control (RRC) connection reconfiguration for the first PDU session from the AN node, after the UE transmits the information indicating the first PDU session ID.

3. The controlling method according to claim 2, further comprising:
   releasing a resource for the first PDU session based on the received message.

4. A controlling method in a Session Management Function (SMF) node in a core network, comprising:
   transmitting an inactivity timer value for specifying a period to a User Plane Function (UPF) node in the core network; and
   determining that a Protocol Data Unit (PDU) session established in User Equipment (UE) is deactivated based on a determination by the UPF node that the PDU session has no data transfer based on the inactivity timer value.

5. The controlling method according to claim 4, further comprising:
transmitting a request for release of a resource related to the determined PDU session, to a network node for mobility management,
wherein the request includes a PDU session identifier (ID) identifying the determined PDU session.

6. The controlling method according to claim 5, further comprising:
indicating to the network node when a PDU session is released.

7. A controlling method in a User Plane Function (UPF) node in a core network, comprising:
receiving an inactivity timer value from a Session Management Function (SMF) node in the core network;
determining that a Protocol Data Unit (PDU) session has no data transfer based on the inactivity timer value; and
notifying the SMF node of no data transfer of the PDU session.

8. A controlling method in a network node for mobility management, comprising:
receiving, from User Equipment (UE) via an Access Network (AN) node, information in a NON Access Stratum (NAS) message, wherein the information includes a first Protocol Data Unit (PDU) session identifier (ID) of a first PDU session to be activated, and wherein the first PDU session ID relates to uplink user data pending for the first PDU session; and
transmitting a message related to the first PDU session, to a Session Management Function (SMF) node associated with the first PDU session ID.

9. The controlling method according to claim 8, further comprising:
receiving another message including the first PDU session ID and tunnel information related to a reference point between a User Plane Function (UPF) node and the AN node, from the SMF node.

10. The controlling method according to claim 9, further comprising:
transmitting a request message including information included in the another message from the SMF node to the AN node;
receiving a response message including tunnel information related to a reference point between the AN node and the network node from the AN node; and
transmitting a message including the tunnel information related to the reference point between the AN node and the network node to the SMF node.

11. The controlling method according to claim 8, further comprising:
transmitting the message related to the first PDU session to the SMF node, with type set to indicate establishment of user plane resources.

12. User Equipment (UE) comprising:
a memory storing instructions; and
at least one processor configured to process the instructions to:
transmit, to a network node for mobility management via an Access Network (AN) node, information in a Non Access Stratum (NAS) Request message,
wherein the information includes a first Protocol Data Unit (PDU) session identifier (ID) of a first PDU session to be activated, and wherein the first session ID relates to uplink user data pending for the first PDU session.

13. The UE according to claim 12,
wherein the at least one processor is further configured to process the instructions to receive a message for Radio Resource Control (RRC) connection reconfiguration for the first PDU session from the AN node, after the UE transmits the information indicating the first PDU session ID.

14. The UE according to claim 13,
wherein the at least one processor is further configured to process the instructions to release a resource for the first PDU session based on the received message.

15. A Session Management Function (SMF) node in a core network, comprising:
a transmitter configured to transmit an inactivity timer value for specifying a period to a User Plane Function (UPF) node in the core network; and
at least one processor configured to process instructions to determine that a Protocol Data Unit (PDU) session established in User Equipment (UE) is deactivated based on a determination by the UPF node that the PDU session has no data transfer based on the inactivity timer value.

16. The SMF node according to claim 15, wherein
the transmitter is further configured to transmit a request for release of a resource related to the determined PDU session, to a network node for mobility management; and
the request includes a PDU session identifier (ID) identifying the determined PDU session.

17. The SMF node according to claim 16, wherein
the at least one processor is further configured to process the instructions to indicate to the network node when a PDU session is released.

18. A User Plane Function (UPF) node in a core network, comprising:
a receiver configured to receive an inactivity timer value from a Session Management Function (SMF) node in the core network;
at least one processor configured to process instructions to determine that a Protocol Data Unit (PDU) session has no data transfer based on the inactivity timer value; and
a transmitter configured to notify the SMF node of no data transfer of the PDU session.

19. A network node for mobility management, comprising:
a receiver configured to receive, from User Equipment (UE) via an Access Network (AN) node, information in a Non Access Stratum (NAS) message, wherein the information includes a first Protocol Data Unit (PDU) session Identifier (ID) of a first PDU session to be activated, and wherein the first PDU session ID relates to uplink user data pending for the first PDU session; and
a transmitter configured to transmit, a message related to a PDU session corresponding to one of the at least one PDU session ID, to a Session Management Function (SMF) node associated with the first PDU session ID.

20. The network node according to claim 19, further comprising:
a further receiver configured to receive another message including the first PDU session ID and tunnel information related to a reference point between a User Plane Function (UPF) node and the AN node from the SMF node.

* * * * *